(12) United States Patent
Hall et al.

(10) Patent No.: US 10,897,771 B2
(45) Date of Patent: *Jan. 19, 2021

(54) WIRELESS STREAM BROADCAST SYSTEM USING SPECTRUM-IMPACT-SMOOTHED CHANNEL SEQUENCING AND DEFERRED ACKNOWLEDGMENTS

(71) Applicant: Hall Labs LLC, Provo, UT (US)

(72) Inventors: David R. Hall, Provo, UT (US); Craig Boswell, Draper, UT (US); Everett D. Robinson, Pleasant Grove, UT (US); Joe Fox, Spanish Fork, UT (US)

(73) Assignee: Hall Labs, LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,047

(22) Filed: Aug. 4, 2017

(65) Prior Publication Data
US 2019/0045519 A1    Feb. 7, 2019

(51) Int. Cl.
| | |
|---|---|
| *H04W 72/12* | (2009.01) |
| *H04B 1/715* | (2011.01) |
| *H04W 72/00* | (2009.01) |
| *H04L 12/24* | (2006.01) |
| *H04W 84/18* | (2009.01) |

(52) U.S. Cl.
CPC .......... *H04W 72/121* (2013.01); *H04B 1/715* (2013.01); *H04W 72/005* (2013.01); *H04B 2001/7154* (2013.01); *H04L 41/16* (2013.01); *H04W 84/18* (2013.01)

(58) Field of Classification Search
CPC . H04W 72/121; H04W 72/005; H04W 84/18; H04B 1/715; H04B 2001/7154; H04L 41/16

USPC ......................................................... 370/312
See application file for complete search history.

(56) References Cited

U.S. PATENT DOCUMENTS

| | | | | |
|---|---|---|---|---|
| 2010/0066531 | A1* | 3/2010 | Karr ...................... | G06Q 10/00 340/539.1 |
| 2016/0003940 | A1* | 1/2016 | Seller ..................... | G01S 13/84 342/132 |
| 2016/0094268 | A1* | 3/2016 | Seller ..................... | H04B 1/69 375/139 |

(Continued)

*Primary Examiner* — Hassan A Phillips
*Assistant Examiner* — Mohammed S Chowdhury

(57) ABSTRACT

Disclosed herein are wireless devices operable at intermediate wireless at ranges of thousands of meters, utilizing packets that include a preamble and a data payload. Devices may be such things as keypads, door latches, occupancy monitors, sprinkler controllers and other devices needing a communications link. A digital spread-spectrum frequency hopping rotation is used, wherein packet transmissions rotate through frequency sequences. Used is a spectrum-impact-smoothed channel sequence, each channel specifying a unique preamble frequency relative to the other sequences and channels. The set is traversed as a broadcasted stream is transmitted, thereby distributing the focused radio-frequency emission impact of packets having long preambles over time. Packet acknowledgments are deferred until a group of packets in a stream has been exchanged. Detailed information on various example embodiments of the inventions are provided in the Detailed Description below, and the inventions are defined by the appended claims.

20 Claims, 11 Drawing Sheets

(56) References Cited

U.S. PATENT DOCUMENTS

| | | | |
|---|---|---|---|
| 2016/0094270 A1* | 3/2016 | Seller | H04B 1/69 |
| | | | 375/139 |
| 2016/0218833 A1* | 7/2016 | Sapio | H04L 1/1628 |
| 2016/0261306 A1* | 9/2016 | Seller | H04W 56/0015 |
| 2017/0063566 A1* | 3/2017 | Seminario | H04L 12/2816 |
| 2017/0374623 A1* | 12/2017 | Dhar | H04W 76/10 |
| 2018/0270038 A1* | 9/2018 | Oteri | H04L 5/0044 |
| 2018/0287869 A1* | 10/2018 | Munafo | H04L 63/0853 |

* cited by examiner

FIG. 4
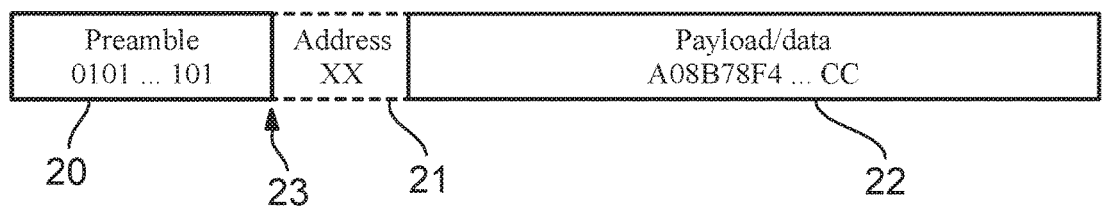
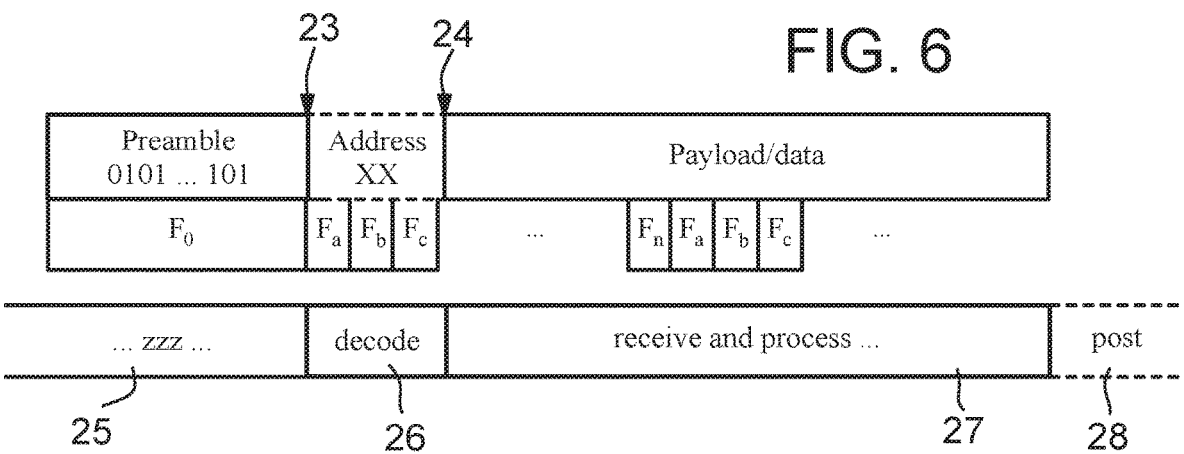
FIG. 5
FIG. 7
FIG. 6

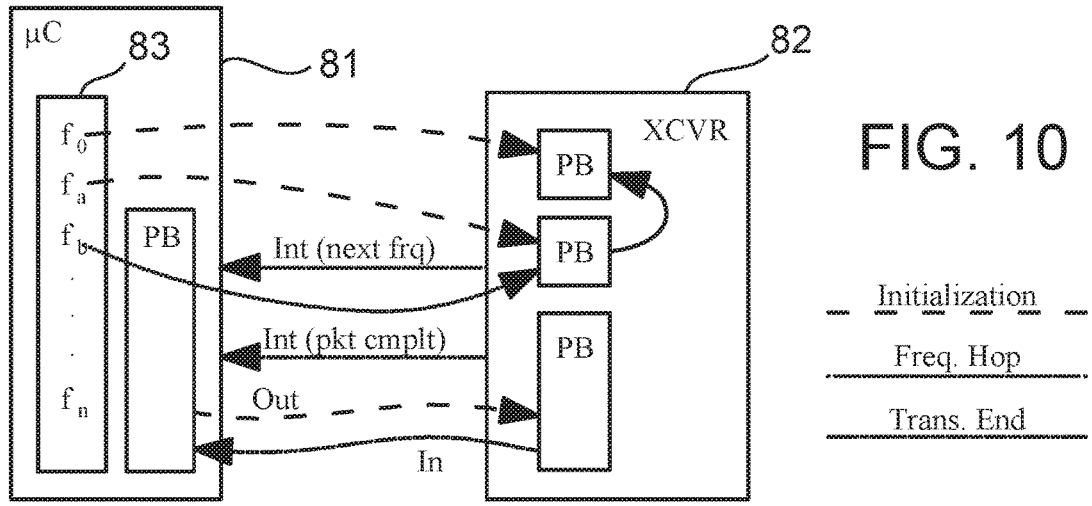
FIG. 10
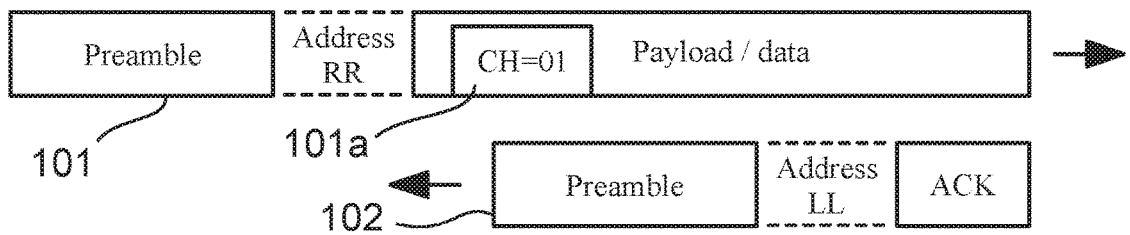
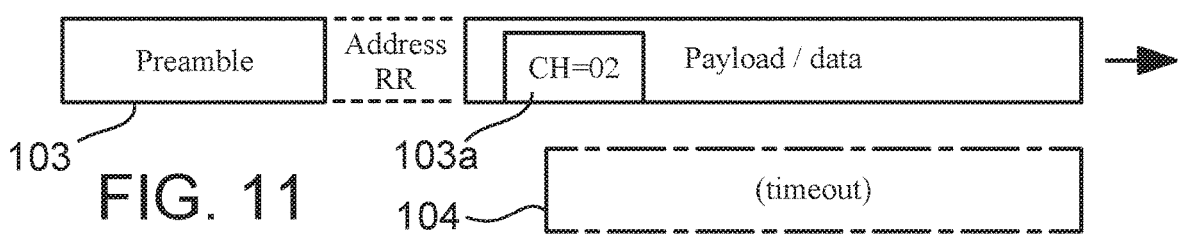
FIG. 11

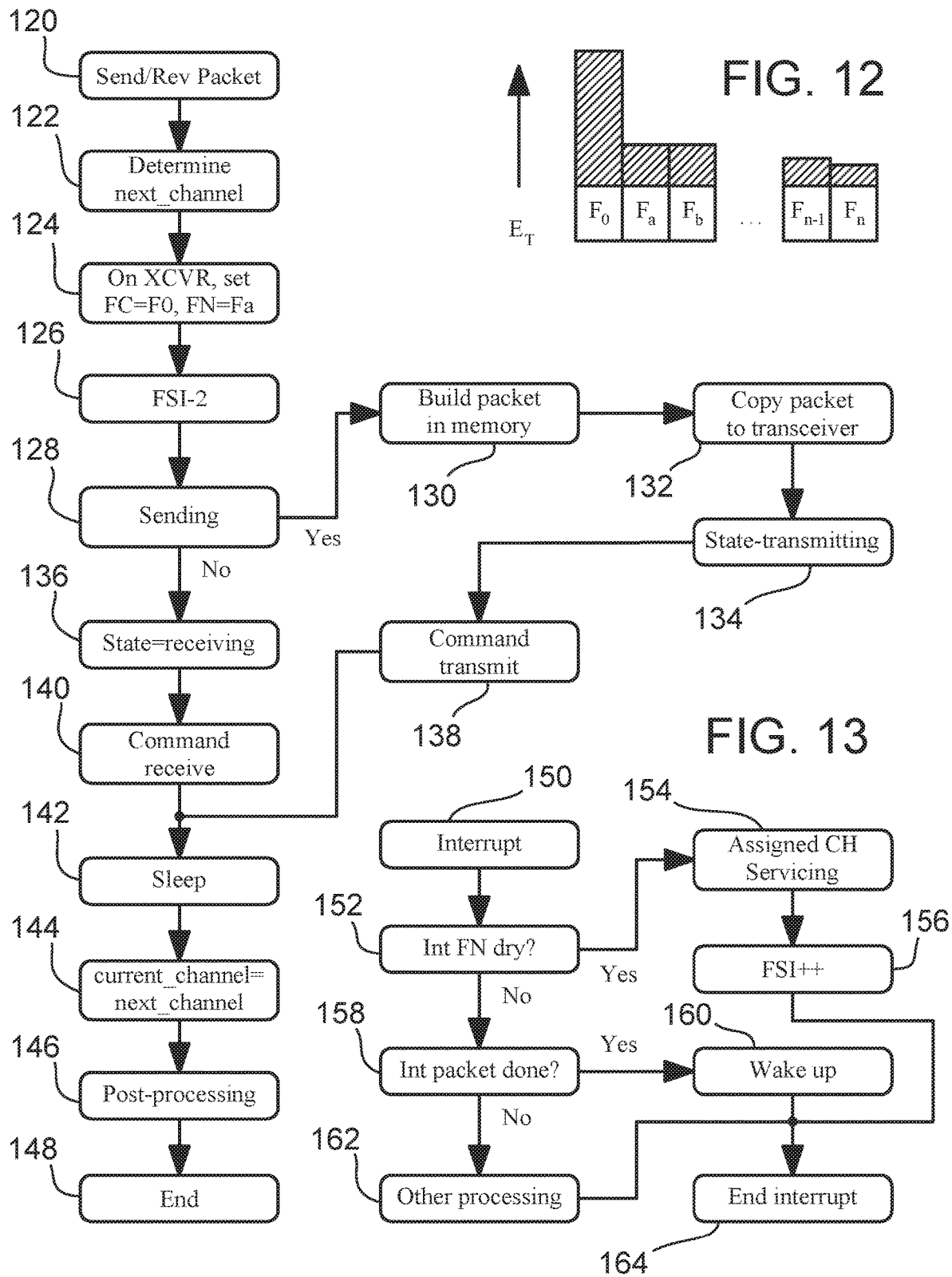

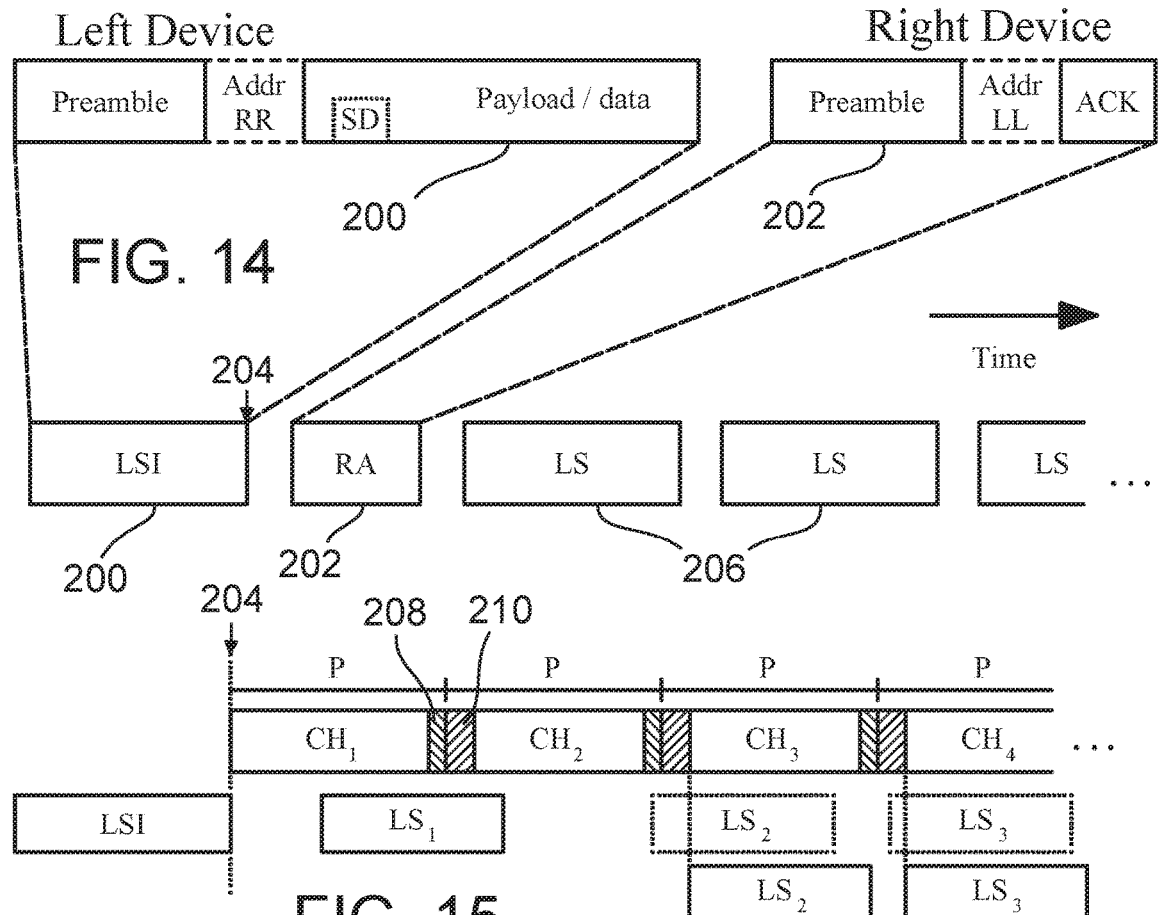
FIG. 14
FIG. 15
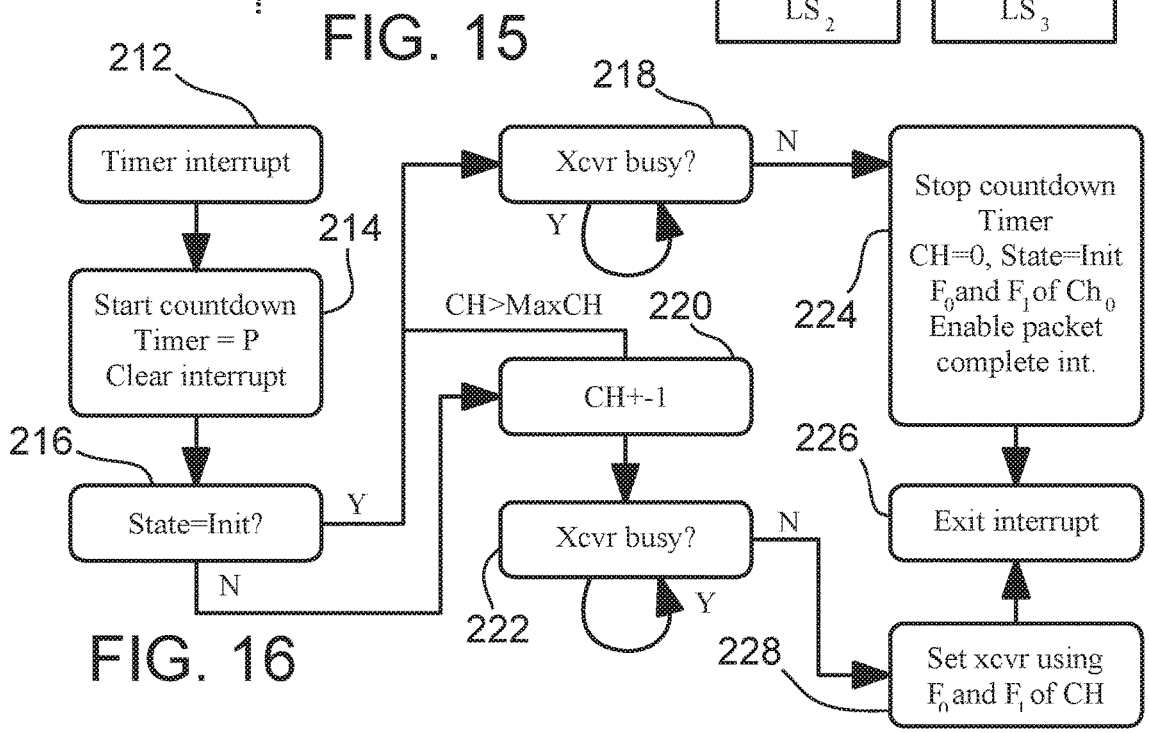
FIG. 16

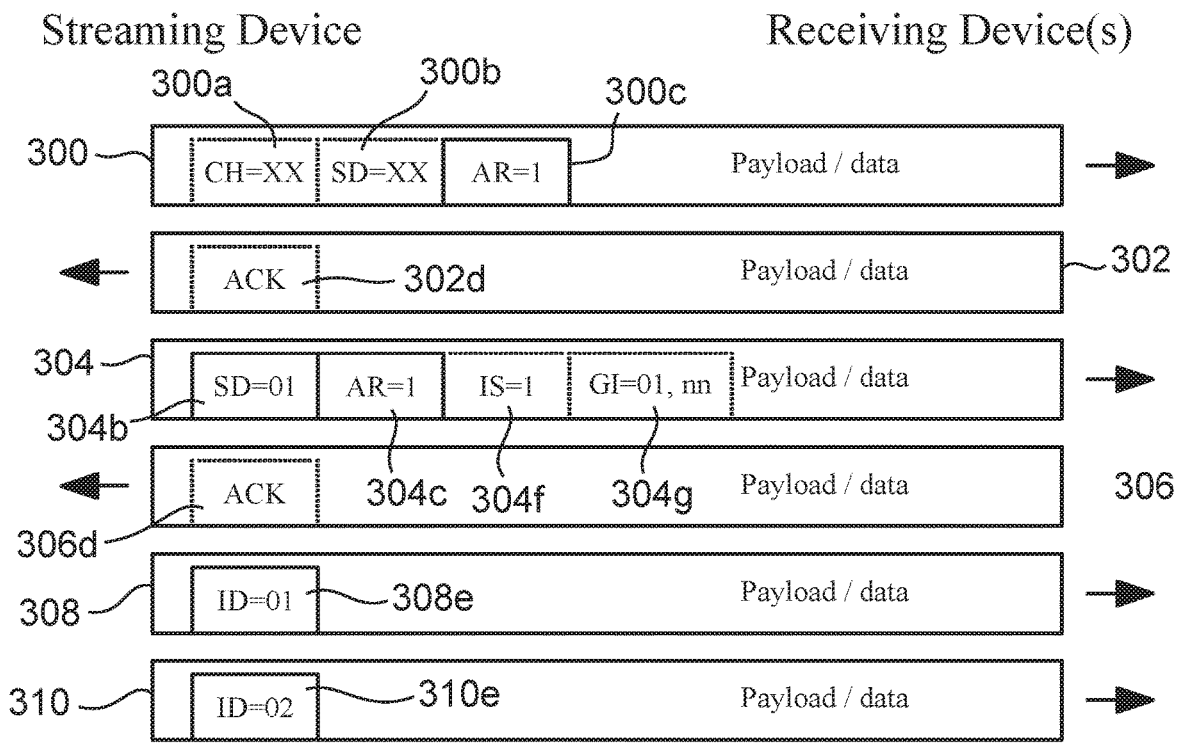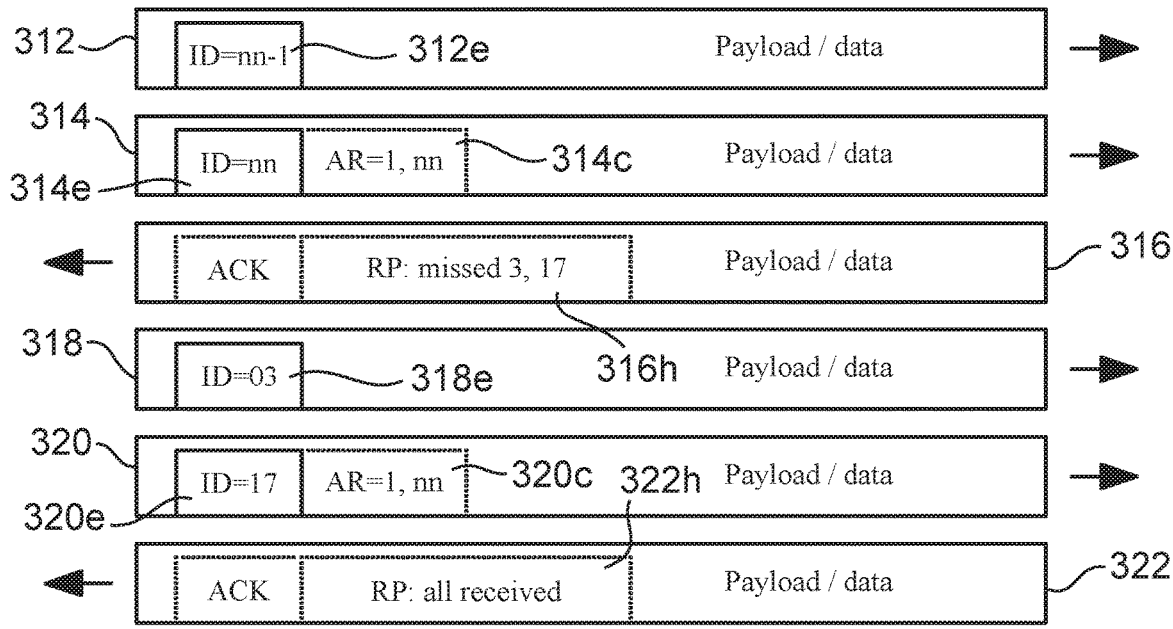
FIG. 20a

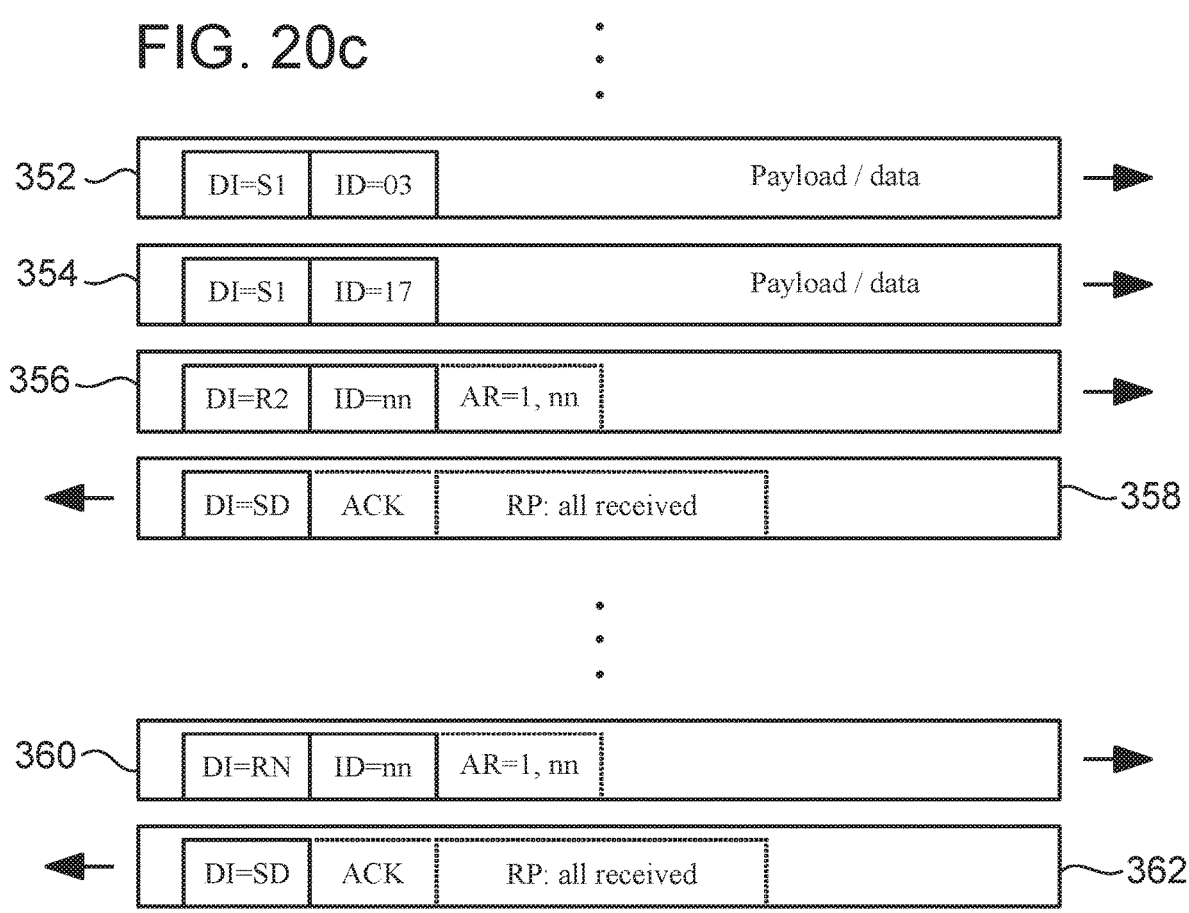

WIRELESS STREAM BROADCAST SYSTEM USING SPECTRUM-IMPACT-SMOOTHED CHANNEL SEQUENCING AND DEFERRED ACKNOWLEDGMENTS

BACKGROUND

In recent history, relatively inexpensive electronic devices have become available to ordinary property-owners that wish to monitor and control various aspects of their properties. A recent concept called the "Internet of Things" imagines home-related electronic devices that can be reached through the Internet, by which an environment can be controlled, e.g. lighting, temperature, digital video recorders, and many other "smart" devices. That kind of device ordinarily requires a connection to a network switch or hub, which connection can be wired or wireless.

Wireless connections to such smart devices are often desired, particularly in existing constructions, avoiding the laying of wires in existing walls and other structures. Technologies serving this purpose include low-wattage devices that communicate using the 2.4 GHz 802.11b/g "WiFi" protocol, and other more-recent and similar protocols such as Zigbee and Z-Wave. These protocols generally permit data rates of 100k bytes per second or more, allowing for devices that transmit and forward audio and video data in substantial real-time. However with high data rates come a vulnerability to interference from other devices operating on the same radio bands, and accordingly devices using these short-range protocols are generally limited to service within a single residence or building within a distance of less than 100 meters.

Recent technologies have been developed that permit operation to an intermediate range, communicating between points that are several miles or more away, for example using the LoRaWAN protocol. In this type of network, interference reduction is achieved by using frequencies in the UHF band and by including redundancies in communication, using for example multiple sampling, multiple frequency (spread-spectrum) techniques, and/or error-tolerant protocols. The use of the UHF band avoids interference from over-the-horizon sources, while at the same time avoiding some attenuation-of-signal from water-vapor, precipitation, buildings and other physical obstructions. These redundancies and protocols necessarily reduce the data throughput such that audio and video data cannot be streamed in good quality or in real-time.

An exemplary use of intermediate-range communication is in the recent deployment of wireless utility meters. Having a utility meter that can be read without a person traveling to and visually looking at it is a substantial cost savings for a utility. For such a use a meter communicates two items of information, which are an identifier for the meter and the meter reading itself; the utility takes a pair of such items and generates a bill for a utility subscriber. Because utility bills are ordinarily generated once per month, the amount of data from a single meter is usually on the order of a few tens of bytes in that period. Thus tens or even hundreds of thousands of meters can share a single intermediate-range channel, largely without interference from other devices.

The unsuitability of existing systems at intermediate ranges for large numbers of devices, for example in the Internet-Of-Things, is an unsolved problem. Turning now to FIG. 2, two proximal short-range networks are conceptually shown, such as those constructed from devices communicating through the 802.11g protocol, for example using the Zigbee specification. In the example two property owners each operate a hub "H" servicing multiple devices "D", and as shown in the figure the circumference of effective communication 10 of each hub is proximal so as to create a zone of interference 11. Communication with the devices in that zone can be affected by communications with a non-subscribing hub, so as to introduce possible packet transmission collisions and interference. However, because these networks are short-range, the zone of interference 11 is relatively small, and the frequency of collisions and interference is likewise negligible. Proximal operators of such networks can experience impacts, but because of the short-range and the short transmission time of packets, these impacts are minor and usually acceptable.

In contrast and as shown in FIG. 3, three intermediate-range networks are located in similar proximity, each with a hub "H" and subscribing devices "D". Because of the greater distance of communication provided, most devices "D" are located in zones of interference 11, and many devices may be located in regions 12 where several hubs are located within range. Thus where intermediate-range networks are to be used, most communication between hubs and devices and also inter-device communications should be expected to take place under conditions of interference, especially when located within a city or other populated area. Utility meter reading and other existing installations using the LoRa or LoRaWAN protocols manage this congestion by being the only network in the radio locality on a particular frequency, and by infrequent packet transmission on the order of once per week or month such that collisions between devices aren't likely. Utility meters are configured and installed by the utility provider, who can limit the number of end-devices within a locality to ensure network reliability. Because the provider is the only consumer of the applicable bandwidth resources, it can effectively control interference and manage congestion.

Unavailable on the consumer market today are hubs and end-devices that can operate at intermediate ranges. The short-range "WiFi" 802.11b/g network is now so popular that in most urban areas there is a router within communicative range no matter where a person finds himself; most households using the Internet now have one, purchased from a retailer. If the range of those routers and the devices they service were to be extended to an intermediate range, the result would be a collapse of system functionality from overwhelming interference. Thus, in order to bring intermediate-range devices to the ordinary consumer, further development is needed.

The existing intermediate-range techniques, however, aren't conducive for applications where interactivity is need. For a channel sharing thousands of meters, it isn't necessary to resolve collisions between devices in a matter of milliseconds, because data transmissions can be delayed without significant impacts. In another example, an irrigation controller will ordinarily keep a set of sprinklers on for minutes at a time, and a delay of multiple seconds or even minutes is tolerable. In contrast, a person activating a light switch, for example, will not accept activation of lights with perhaps more than a one-second delay. Where a person enters a code on a keypad to enter a building, he expects a controlled lock to deactivate in real-time. In general, the existing intermediate-range technologies are fault-susceptible and not reliable for such interactivity, particularly where multiple devices share a common communications frequency or channel.

Interactivity issues for battery-powered devices can be even worse. For these devices, it is generally undesirable to keep a receiver continuously powered, and worse to repeatedly being awakened from a sleep mode to process and discriminate packets destined for other devices. The LoRaWAN Class A and B protocols address this by having end-devices turn off their receivers for long periods of time, waking up periodically to interact with a network gateway. Such a device may remain asleep for seconds, minutes or even hours, and thus cannot be made responsive to incoming queries. Furthermore, these protocols are susceptible to collisions from co-transmitting devices, which may require backing off interactions with a hub, and no time of reception can be guaranteed. Thus absent from the field of the invention is a system that can provide adequate and reliable service for groups of sensed and controlled remote devices at intermediate ranges.

BRIEF SUMMARY

Disclosed herein are wireless devices operable at intermediate wireless at ranges of thousands of meters, utilizing packets that include a preamble and a data payload. Devices may be such things as keypads, door latches, occupancy monitors, sprinkler controllers and other devices needing a communications link. A digital spread-spectrum frequency hopping rotation is used, wherein packet transmissions rotate through frequency sequences. Used is a spectrum-impact-smoothed channel sequence, each channel specifying a unique preamble frequency relative to the other sequences and channels. The set is traversed as a broadcasted stream is transmitted, thereby distributing the focused radio-frequency emission impact of packets having long preambles over time. Packet acknowledgments are deferred until a group of packets in a stream has been exchanged. Detailed information on various example embodiments of the inventions are provided in the Detailed Description below, and the inventions are defined by the appended claims.

BRIEF DESCRIPTION OF THE DRAWINGS

FIG. 4 shows an exemplary wireless data packet structure that includes a preamble and a variable payload.

FIG. 5 illustrates an exemplary frequency-sequence table usable in digital spread-spectrum communications between a hub and an end-device.

FIG. 6 depicts typical power states of an end-device through the course of reception of one kind of intermediate-range wireless packet.

FIG. 7 shows an exemplary set of discrete and orthogonal wireless channels for communication between a hub and a set of end-devices.

FIG. 10 illustrates the operation of a wireless device on one side of a DSS communication link having a microcontroller and a transceiver.

FIG. 11 depicts a procession of packets including a synchronization directive of successive SIS channel switching.

FIG. 12 depicts a representative accumulated emissions on a frequency spectrum for a transmitter operating using a single DSS channel and preamble-based packets.

FIG. 13 shows traversal of a microcontroller through an exemplary set of states using an spectrum-impact-smoothed channel set.

FIG. 14 depicts a sequence of packets streamed from a left device to a right device including a first packet with a streaming directive.

FIG. 15 depicts a time-slotted schedule of SIS channels relative to a point of synchronization in a first packet initiating a stream.

FIG. 16 depicts an exemplary state machine of a stream-receiving wireless device managing timer interrupts.

FIG. 20a depicts an exchange of packets using an exemplary protocol between two devices that includes acknowledgments handshaked and deferred.

FIGS. 20b and 20c depict an exchange of packets using the exemplary protocol of FIG. 20a from a stream-producing device broadcasted to a plurality of receiving devices using deferred acknowledgments.

DETAILED DESCRIPTION

Figure 1:
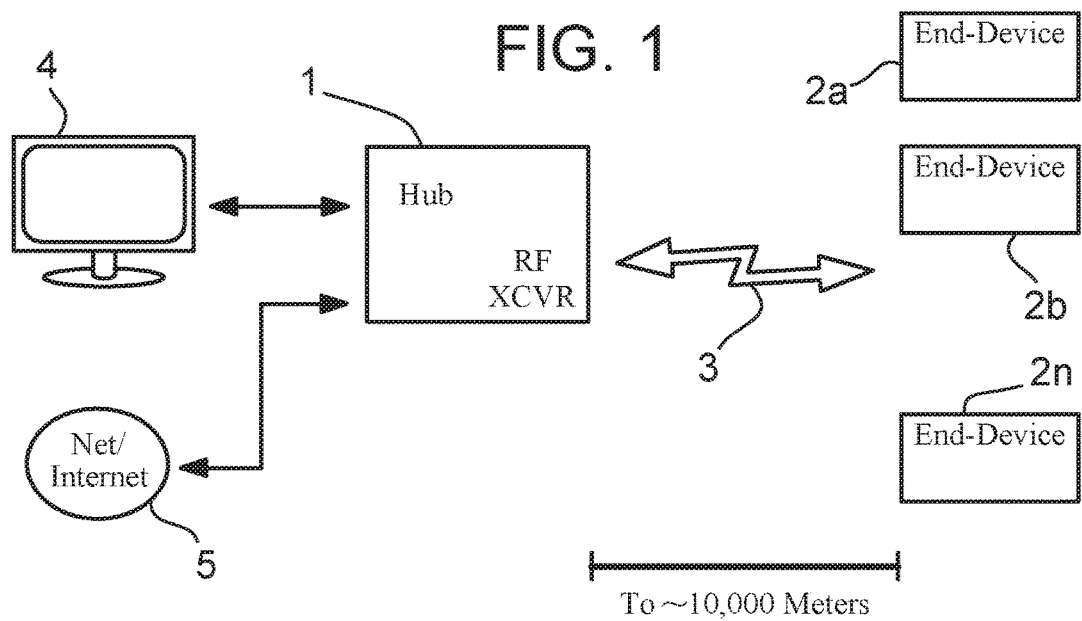
FIG. 1 depicts a network topology utilizing multiple end-devices and an interactive hub.
Figure 2:
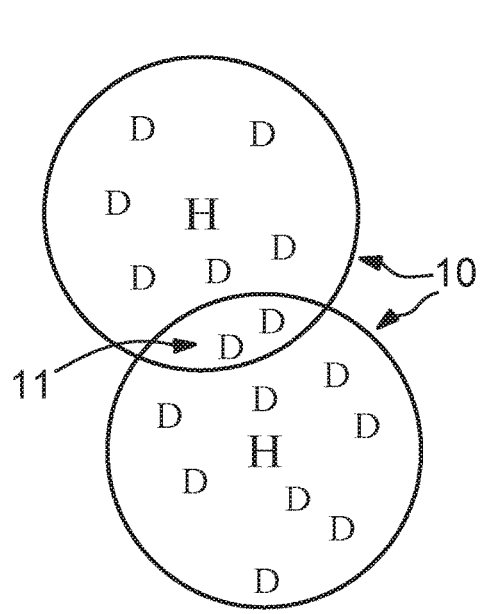
FIG. 2 depicts potential interference in two proximal short-range wireless networks.
Figure 3:
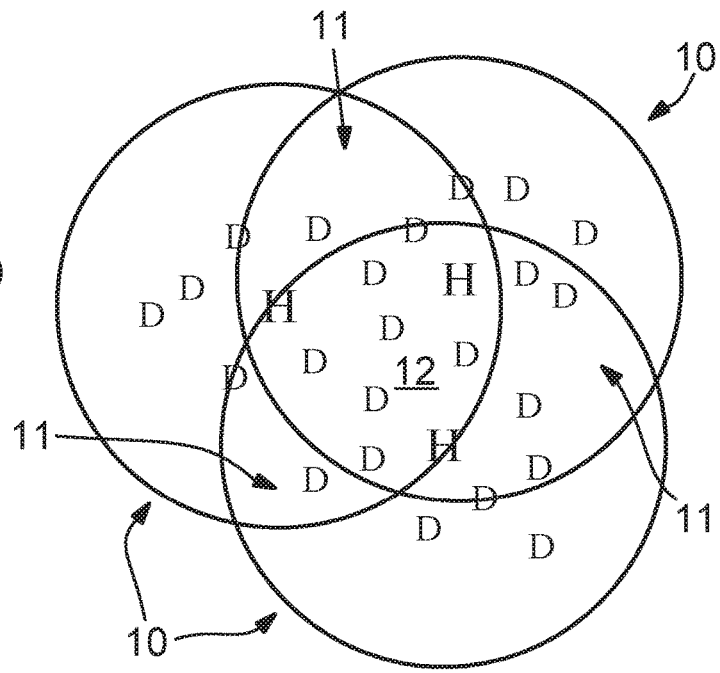
FIG. 3 depicts potential interference in three proximal intermediate-range wireless networks.

Shown in FIG. 1 is an exemplary intermediate system employing a hub-type topology. A hub 1 is placed within wireless range of end-devices 2a-n, communicating 3 over the airwaves at a distance of up to 10 km or more, depending upon environmental conditions. In many cases, end-devices 2 are electronic devices that accept commands and transmit information to a controlling hub 1. Included in hub 1 and each of end-devices 2a-n is a processor, software for performing the functions of the device, and an RF transceiver. Hub 1 could be an ordinary personal computer with an RF adapter or card installed, or it might simply look like a box with an antenna and a port or interface permitting configuring and monitoring; it is foreseen that a manufacturer would likely supply a hub 1 in a ready-to-use state such that an installer need not open its case or install any software. In one configuration, hub 1 is connectable to a personal computer 4, for example through a USB interface, computer 4 having installed thereon software functional to configure and monitor the hub 1. In another configuration, hub 1 has a network port whereby communications may be had with network 5. These communications may be through any conceivable type or protocol. In one example a hub 1 sends messages through a TCP/IP sockets-based protocol to a proprietary server existing on the network 5. In another example, hub 1 has software that permits it to be seen as an HTTP server from any device on network 5. Thus in some installations, hub 1 may be connected directly to and accessible from the Internet, allowing for access from any Internet-connected device. The antenna of hub 1 will typically be elevated and located in an obstruction-free locality to maximize signal-strength with end-devices 2.

End-devices 2 are preferably manufactured in an unconfigured state, ready for pairing with a hub 1, each device having a unique identity (UID) to discriminate it from others. Such end-devices 2 can be of varying types, providing many kinds of control and sensing functions. In one example, an end-device has an infra-red motion sensor built in, includes programming to record the time of the last motion event, and may also include programming to initiate a notification packet to a hub 1 upon a motion-sensing event. In another example, an end-device includes a keypad whereby a person can enter a code, upon which a message is sent to hub 1 containing a sequence of keypresses. Such an end-device may be paired with another device which activates and deactivates a door latch, by way of messaging from hub 1, and the hub contains programming and configuration to read the keypad end-device and control the latch end-device as correct codes are entered. In a further example, several end-devices 2 are located throughout a building, sensing the temperature at various locations. Another end-device 2 controls a central-air system, providing heating and cooling to the building at the direction of hub 1 without human intervention based upon thermostat data forwarded through hub 1. The kinds of end-devices 2 that can be employed are virtually limitless, so long as they are electronic and provide either a control or a sensing function while staying within the available data throughput limitations.

Intermediate-range packets and transferrence basics.

Described herein are electronic devices that are functional at intermediate ranges even in populated or congested areas, providing for simple installation by an ordinary home- or business-owner, as will presently be described and shown. These devices can be made reliable enough to use in failure-intolerant situations, such as security systems, even where an RF spectrum is congested. Remote devices can be made to operate on battery power, use low-power transmitters, and in many cases made to operate through the sending of a single bit per packet. Equipment can be made to fit in a hand-held enclosure, e.g. with a small omnidirectional antenna operating in the UHF frequency band. It is sometimes the case that a low-data rate network device will be desired to be placed in a location where power is available, but where neither network cabling nor a WiFi network is available. This kind of application is particularly suitable for intermediate range equipment. One kind of intermediate-range technology is known as "LoRa", descriptions of which are publicly available from the LoRa Alliance of San Ramon, Calif., which maintains a website at www.lora-alliance.org.

Shown in FIG. 4 is the structure of a simple data packet which may be used in communication between a hub and an end-device, a sub-type of which is used in the LoRa protocol. The structure has three parts, which are a preamble 20, a data payload 22, and an optional address 21. Payload 22 is generic and can contain many kinds of data as desired, depending upon the functions provided by an end-device. Payload 22 will often contain a command or a response, for example a command to open a latch or a response that a power switch is presently in an "on" state. Address 21 discriminates between devices operating on the same communications channel, and may not be needed where a single hub and end-device pair are the sole devices operating on that channel. (A description of what defines a channel appears below.) Preamble 20 is present to provide synchronization for a radio-frequency receiver, at a hub or an end-device, at a programmed frequency such that the receiving device can decode the contents of the packet. A preamble is preferably a fixed, identifiable and unnatural pattern that can be recognized by a simple state machine without starting a general-purpose processor. The packet structure of FIG. 4 can be transmit using many modulation techniques; LoRa devices use frequency shift keying for interference immunity, although other modulations can be used in accordance with the dictates of a particular operating environment.

Packets can be transmit over a single carrier frequency, if desired, but because of benefits including resistance to noise and reduced impacts on particular parts of a frequency spectrum, spread-spectrum modulation has become popular. In this modulation technique, a sequence of frequencies is provided at a transmitter and a receiver; although in traditional encrypting systems the sequence might be generated by a pseudo-random generator with a secret seed and function parameters (which still can be used), for noise resistance and spreading of Tx power all that is needed is a sequence of frequencies uniformly spread over a given available set. This can be accomplished by the inclusion of a table as shown in FIG. 5, containing a sequence of n frequencies. In the example, each frequency $F_x$ is indexed by a sequence number $I_n$, such that the current operational frequency can be determined as a function of time from a point of synchronization, for example the end 23 of the preamble of a packet as in FIG. 4. The arrangement of frequencies in a sequence may be incremental, random, or in any order desired, keeping in mind that use of each frequency an equal number of times will result in the desired uniformity.

The transmission of a packet using this modulation technique is as shown in FIG. 6, beginning with the preamble at a known initial frequency $F_0$. The preamble is preferably not just a square wave, but a pattern whereby synchronization point 23 can be positively determined. The transmitter then sequences through the frequencies at a known period, mirrored by the receiver. For noise and interference immunity the sequence period is preferably much shorter than the time needed for each bit or symbol, but longer periods can be used to achieve a spreading of power across a spectrum. The sequence period should preferably be much shorter than the time of preamble transmission, such that preambles are easy to distinguish.

The power consumption of a transmitter is necessarily high during packet transmission, most of the power likely being consumed by the Tx output stage circuitry. A receiver, on the other hand, can implement a power-conserving procedure. Referring again to FIG. 6, the processor of a receiving device maintains itself in a state of sleep 25 while processing and receiving activities aren't underway; this can be particularly important for certain kinds of devices, especially for end-devices reliant upon battery-power, such as those with solar cells. A receiving device has built thereinto its receiving circuit an automated preamble recognizer; when recognition occurs a signal is sent to a processor to awaken and enter an active state of packet decoding 26. In the example of FIG. 6 an address is used, and the receiving processor performs functions needed to determine if the address in the packet is for its device. If an address is decoded and the packet is determined to be destined for another device, the processor can reset and go back to a sleeping state 25. For maximal power savings, therefore, an address is preferred to be toward the front of a packet, where it will be transited across a channel first before a data body. Where an address is matched, or where an address isn't used, a processor enters states of receiving and processing incoming data 27 and post-receipt processing 28 as needed. So in order to keep the processor of a particular device in a non-active state, it is important to positively discriminate the receipt of preambles of packets directed to the device from the preambles of other devices.

Multi-channel intermediate-range implementations.

Existing intermediate-range networks use a common initial DSS frequency and/or channel for communications with devices in that network. This method has the advantage of making setup extremely simple. By this method, other networks may use other initial frequencies or channels, thereby discriminating between members of their respective networks. As such networks change to include interactive devices or grow to large numbers of member devices, the possibility of congestion, collisions and interference becomes a greater concern.

Figure 8:
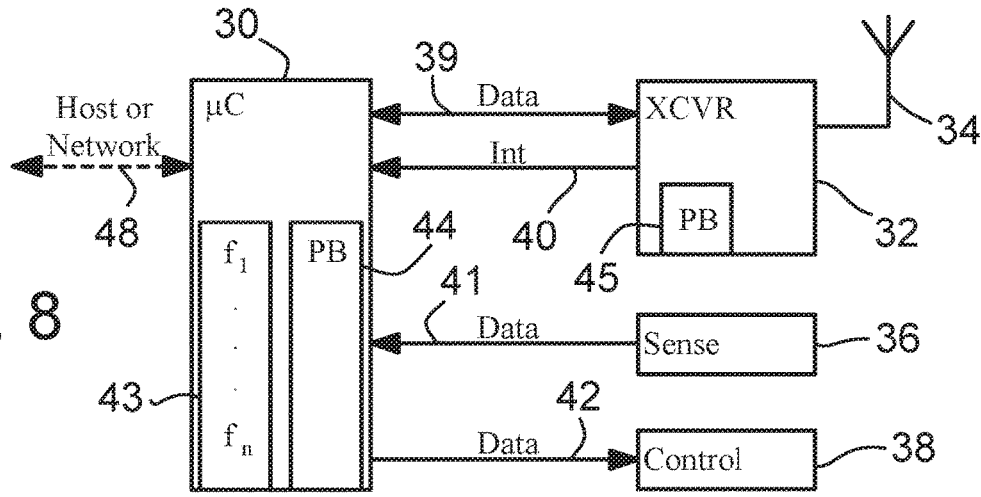
FIG. 8 shows an exemplary circuit architecture suitable for an ordinary end-device.

Now turning to FIG. 8, a basic circuit is shown typical of many present intermediate-range network devices, which can support either single- or multiple-channel operation. The main parts of this circuit are a microcontroller 30 and an RF transceiver 32, which is connected to an antenna 34 located in a position to provide clear communications to other devices. A transceiver 32 may be essentially some analog radio-frequency circuits combined with a logic state machine that permits automatic operation for all or part of a packet transmission or reception. The use of transceiver 32 may leave the microcontroller 30 with additional processing capacity for such things as reading sensors, managing control circuits, etc., which may happen at the same time that packets are transiting a communications channel. Communication between the microcontroller and the transceiver is by way of data lines 39 and interrupt lines 40, by which microcontroller 30 manages the functions of transceiver 32 and transfers packet information received and to be sent. Transceiver has a packet buffer 45 sufficient to store all or part of a single packet, read- and write-accessible through data lines 39. Data lines 39 can be varied according to need or capabilities of a transceiver used, while interrupt lines 40 signal to the microcontroller events such as the start or completion of reception of an incoming packet. Were transceiver 32 to be a Semtech SX127x (introduced below), for example, data would be transferred by way of a single-bit wide serial bus using address locations to control registers and access a packet buffer, and data lines 39 would include single lines for in, out, clock and sync. In that example, a packet completion interrupt would be generated by a transition on the DIO0 line. When transceiver 32 is configured for operation on a channel orthogonal to those used by other end-devices, such interrupts would not occur when those end-devices communicate and microcontroller 30 would be left free to sleep or engage in other processing activity.

Microcontroller 30 also contains a packet buffer 44, which is typically larger than the transceiver buffer 45. As packets are to be transmitted, the microcontroller transfers them to the transceiver by way of data lines 39, typically one at a time. Packets received are correspondingly transferred from buffer 45 over the data lines and stored for processing in buffer 44. Apart from this packet data, setup commands are also sent by microcontroller 30 to program the transceiver for proper operation on a channel, once at initialization for single-channel operation and subsequently with or between packets where more than one channel is used. Where microcontroller 30 has been programmed for multi-channel operation, each packet within buffer 44 may carry with it a channel on which it is to be sent, or parameters thereof.

In an implementation using the Semtech SX127x and digital spread-spectrum, microcontroller 43 also contains a frequency table 43, as described above for FIG. 5. For that implementation, the transceiver 32 has storage only for two frequency settings, which are the one presently in use and the one to be used when it is time for a hop to a new frequency. The transceiver generates interrupts to the microcontroller indicating it is ready to receive the new frequency setting, which is subsequently sent over data lines 39 before the frequency hop is to occur. An alternate configuration would put frequency table 43 entirely on the transceiver 32, but for this example a simplified transceiver is used that does not.

Where a transceiver 32 and microcontroller 30 pair is incorporated into an end-device, at least one of a sensor 36 or a controller 38 will be included. Sensor 36 could be virtually any sensor, examples of which are a temperature probe, a keypad, a lighting sensor, an entryway closure detector, a motion detector, and a camera. Controller 38 could control a latch, a power switch, a thermostat, a motor speed controller, and many other things. Sensor 36 and controller 38 are connected to microcontroller 30 through data lines 41 and 42, which lines may be of any needed configuration, analog or digital. Where a transceiver 32 and microcontroller 30 pair is incorporated into a hub, sensor 36 and controller 38 may be omitted. Instead, a connection to a host processor or network 48 would be included, permitting configuration of and interactions with end-devices at intermediate-range.

While functioning as an end-device, one microcontroller 30 paired with one transceiver 32 are sufficient to operate in an ordinary way. Transceiver 32 is capable of being configured for a desired channel and transmitting or receiving packets to and from a hub, though not at the same time. End-devices do not typically have a need to do both concurrently, so this is usually not an issue. However there are advantages to incorporating multiple transceivers in a hub, as will be presently explained.

Figure 9:
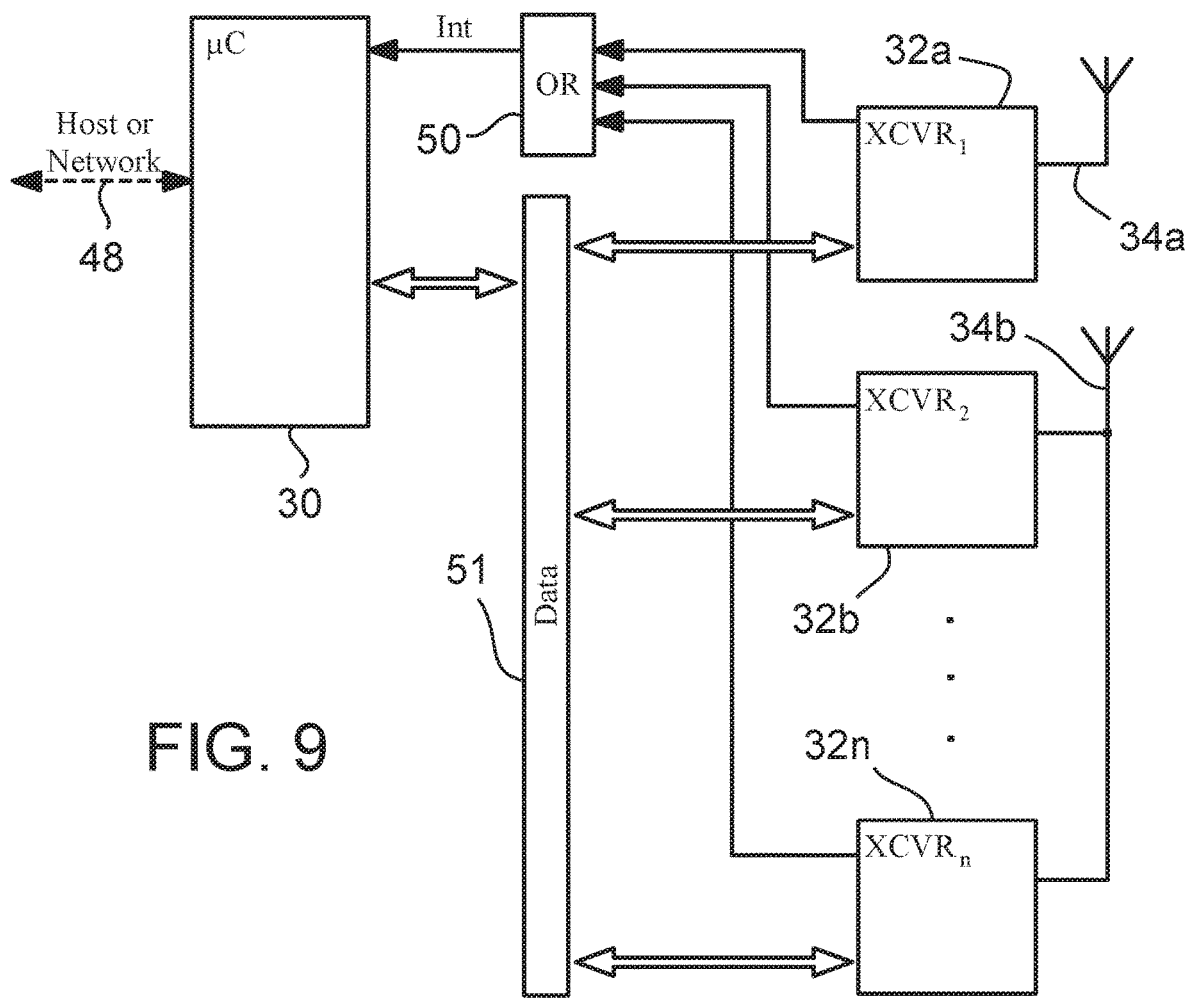
FIG. 9 shows an exemplary circuit architecture suitable for a hub having one transmitter and a number of receivers for simultaneous operation on differing channels.

FIG. 9 illustrates one configuration that may be used in a hub, providing multiple transceiver functionality. Here a microcontroller 30 is connected to n transceivers 34a through 34n by way of an interrupt gate 50 and data bus 51. Included within data bus 51 is sufficient multiplexing circuits to allow the microcontroller 30 to individually address each transceiver. In the example where the Semtech SX127x transceivers are used, this may be done by dropping the NSS pin of the individual transceiver to be attended to. Interrupt gate 50 combines the interrupt signals of each of the transceivers such that any interrupt in the group interrupts the microcontroller, and code therein can identify the particular transceiver flagging the interrupt and take appropriate action. In the drawing gate 50 is an OR logic gate, which suffices when all interrupt lines are low in a normal (non-interrupt) state; gate 50 could be AND logic gate if the reverse were true (lines normally high with low signal indicating an interrupt), or gate 50 could be a combination of logic circuits if needed. Now in practice it may be there are a sufficient number of interrupt inputs and general I/O pins on microcontroller 30 such that gate 50 and bus 51 aren't needed, particularly where the number of transceivers n is kept small, allowing for the microcontroller to communicate using parallel lines duplicating the setup and methods of FIG. 8.

The exemplary hub of FIG. 9 has the capability of transmitting and receiving wirelessly with end-devices at the same time, through antennas 34a and 34b. Antenna 34b is connected as an input to each of transceivers 32b through 32n, allowing each transceiver to receive on a different channel as programmed from the microcontroller 30. Depending upon the type of transceiver used, each transceiver may be isolated through filters and amplifiers (not shown) such that the proper impedance at the operational frequency range is preserved. Note that such a tying of transceivers to a common antenna makes them ineffective for concurrent operations in a transmitting mode; therefore microcontroller 30 would be configured to keep them in receiving-mode only. In contrast antenna 34a and transceiver 32a are configured to transmit and receive, having no sharing of antenna resources. Consideration should be given to shielding and to the distance between an antenna that may be used for transmitting and others that may be used for reception, such that potential interference is avoided.

The example shown in FIG. 9 has the capability of transmitting and receiving at the same time, with n−1 receivers monitoring one channel each. Transceiver 32a can be transmitting while all of 32b-n are ready to receive packets as they may transit n−1 channels. Microcontroller 30 may use the transceiver capable of free transmit operation 32a to perform interactive communication with an end-device without channel reprogramming, alternating between sending and receiving over the same channel. Alternatively, when using interactive communication with a particular end-device, microcontroller 30 may command transceiver 32a to switch to different channels as needed for transmissions to other end-devices, allowing one of transceivers 32b-n to receive the next packet from the particular end-device. If this is done, it is preferred that any transceivers configured to receive on the same channel be turned off, so as to avoid the discarding of packets produced at the hub. Assuming interactions with an end-device are symmetric in length, in theory the setup shown in FIG. 9 will support up to two concurrent interactive sessions with two end-devices while at the same time monitoring n−2 other lone-channel end-devices for alerting packets sent spontaneously, or more than that number of end-devices where such channels are shared (using the asynchronous mode described below, for example.)

In practice, the constraints on the number of transceivers that can be used will depend upon several factors. One of these is the speed of data bus 51 against the efficiency of commanding transceiver setup, and sending and receiving packet data. As most of the transceivers of the setup of FIG. 9 are used to receive, this limitation would be experienced in two main ways. First, it is possible to flood the system with incoming spontaneous packets such that they cannot be retrieved with sufficient speed across bus 51. The second way comes into play when single receivers 32 are each used to monitor multiple channels, for example when the number of monitored channels exceeds n−1. The reprogramming of a transceiver 32 across the bus 51 requires some time, and if that time exceeds the packet preamble length, packets will fail to be received. Where more than two channels are monitored by a single transceiver 32, the dwell time on a channel (to detect whether a packet transmission is in progress by an end-device) may further exacerbate this problem.

Another limitation of the setup of FIG. 9 relates to the use of a single transmitter. For example, interactive communication can be had with not more than two end-devices where that communication is symmetric. Thus if an event occurs that requires a simultaneous response to multiple end-devices, some of those responses may be delayed beyond a timeout period. This problem can be mitigated through the addition of more transceiver/antenna pairs, if those antennas can be placed at a sufficient distance from the receiving ones and if regulations allow. Note that although end-devices can be constructed with multiple transceivers, as in FIG. 9, it is expected that one transceiver will be sufficient for all but the most exceptional circumstances.

Wireless channels, orthogonality and communications principles.

A wireless frequency spectrum can be segmented into definite channels that reduce interference and avoid unnecessary receiver power-up events on non-destination devices. Such channels are preferably "orthogonal" to each other as well, meaning that communication on one channel is very unlikely or practically impossible to interfere with communication on another. In one of the simplest channel designation schemes, each channel is assigned a unique and available center frequency per channel, for example as was done on the now-obsolete analog television spectrum. A one-to-one relationship is made between transmitters and frequencies in a radio locality, and all devices are to use only their assigned spectrum and nothing outside. For example, the 902-928 MHz ISM band could be divided into 52 500 kHz-wide channels, or 208 125 kHz-wide ones. Given that an intermediate network supporting ordinary consumers might have a range of many kilometers and thousands of end-devices, that is considered an insufficient number to avoid interference. Therefore further methods of discrimination are preferably used.

Introduced now are certain transceivers made for the LoRa protocol, commercially available from Semtech Corporation, which are identified as the SX127x product line. Note that there are transceivers available from other manufacturers that are equally suitable; these Semtech ones are used in this description merely out of convenience as a basis for discussion. The SX127x products are designed to be coupled to a microcontroller handling communication channel configuration and packet management, and have settings for a carrier frequency, signal bandwidth and the number of "chips" per symbol (6 settings), a chip being the smallest datum used in communication. Each combination of those represents substantially a unique channel orthogonal to others, potentially permitting collision-free communication where there is no more than one transmitting device per channel. Using such combinations, two channels may share a common carrier frequency or DSS carrier sequence, while still maintaining orthogonality. Other settings can be used to make additional channels having "partially-orthogonality" including an address, a bit rate, a CRC rate, an encoding type (Manchester/whitening/none), and others according to the manufacturer specifications; note however that the use of partially-orthogonal channels can result in processor-awakening events for packets destined for unintended end-devices, although they can be greatly reduced.

Upon identification of a useful set of channel combinations, a table can be constructed as shown in FIG. 7, each channel having a unique combination of settings useful for communication. In this example, each channel is assigned a spread-spectrum frequency sequence (FS), a spreading factor (SF), and a bit rate (BR) of communication. In one configuration, available frequency sequences are spread evenly over channel assignments, such that the preamble for each channel is sparsely or uniquely used—that is a device transmitting a packet on an assigned channel would use the first frequency in the sequence while transmitting the preamble, followed by the use of other frequencies in sequence. Other channel combinations can be varied in accordance with needs present, for example a frequency sequence could be replaced with an operating frequency where spread-spectrum communication was not used.

Upon determining a set of channel combinations, assignments can be made for individual devices. Again some devices are tolerant of long latencies, and no special treatment of these is required. Other devices serve better being on a channel that is free or substantially free of conflicts. The assignment of a channel to a hub and an end-device requires a setting at both, and this could be made by a manufacturer or its representative at the time of installation.

Frequency Sequence Processions and Spectrum Impact Smoothed Channel Sets.

Where packets carrying a preamble such as that shown in FIG. 6 are used, the impact to the frequency $F_0$ in the usable spectrum is larger than the impact to other frequencies $F_a$ through $F_n$ generally. This effect is caused in large part by the long time used in transmitting the preamble, during which time the transmitter must remain on the same frequency $F_0$ for synchronization as compared to the other successive frequencies used. The longer the preamble with respect to the packet, the more exaggerated is this effect. Additionally, the frequencies at the end of the sequence toward $F_n$ are used less frequently, due to the end of packet usually occurring in the middle of the frequency sequence, which may be exaggerated by short packets. As seen over time, if a frequency sequence is used continuously the impact on the spectrum of usable frequencies will be as depicted in FIG. 12, with accumulated emissions over time ET focused on the preamble frequency $F_0$ and an uneven impact ramping down through the frequency sequence.

This focused impact can be avoided through rotation of channels, each having a different frequency sequence and a unique $F_0$ used in a preamble relative to the other channels used in the rotation, hereinafter referred to as a spectrum-impact-smoothed (SIS) channel set. So looking back to FIG. 7, an SIS set maintaining the same bit rate and spreading factor could be fashioned from channels 0, 2, 4 and so forth, and another sequence could be ordered 1, 3, 5, etc., provided that the channels in each sequence included an $F_0$ unique to the others in that sequence. Within the set of sequences, where each frequency used occupies each sequential position no more than once through the channel set, the smoothing effect can be increased, although that is not necessary. Using the representation of FIG. 5, if there are n=72 frequencies usable in a DSS sequence, each would occupy the $I_0/F_a$ position exactly once through all sequences to make an SIS channel set of 72 channels. Preferably, each frequency would also occupy each $I_1/F_b$ through $I_{71}/F_n$ position exactly once as well to maximize the evening effect in the spectrum.

Frequency sequences can be generated and stored beforehand, or generated on the fly as needed. In a simple example, 72 adjacent ordered frequencies are available for use, and a set of SIS channels are generated by choosing a unique starting preamble frequency $F_0$ having the same position in the order as the channel number, each frequency in the sequence rising though the order and wrapping around as needed. In another example, an order is generated randomly, assigning one channel to each preamble frequency. In yet another example, a simple calculation or a pseudo-random number generator uses the channel number and the number in sequence to arrive at a frequency as needed. In the example shown in FIG. 5, the frequency used for the preamble is left unused for the remainder of a packet transmission, assisting in the equalization of frequency impacts where short packets are the norm. That is not required; a preamble frequency $F_0$ can be repeated, particularly where traversal through a sequence is also repeated where a packet is long.

As described above, the synchronization of frequency hopping through a series of frequencies can be done through detection of the end of a preamble. Two sides of a communication link will also need to be synchronized with respect to a channel, as traversal proceeds through an SIS set. That synchronization can be to any event shared between the sides, such as the traversal of a packet of a particular type or carrying a particular identity. In one example, a timeout period is used for synchronization: where a packet hasn't traversed the link for a specified period of time, both sides synchronize on the initial channel of an SIS set. This may also provide a fail-safe mechanism for dropped packets, allowing resynchronization in case of error.

In one implementation, two sides of a communications link utilizing an SIS set switches channel following every packet traversing the link, without further direction or instruction. The devices on both sides of the link follow a set of rules, including an order of traversal through the SIS channel set used. In one variation, the channels are used in an incremental order using a simple index variable, proceeding through channel 0, channel 1, channel 2 and so forth with each packet, wrapping around back to zero when all channels have been used. In another variation, the order of channels used follows a pattern stored in memory in a table or other structure. In yet another variation, a next channel is calculated using a pseudo-random formula using an incrementing index or the index of the channel currently being used, retaining other communication parameters such as bit rate, spreading factor, etc. In yet another variation, a microcontroller performs a calculation to evaluate the emissions impact on frequencies used since the beginning of traversal through the SIS channel set, and the next channel is selected to have a preamble frequency impacted less than the others since traversal began, thus maximizing the evening effect. A next SIS channel may generally be determined using a computation deterministic from information residing in the memory of both devices. In yet another variation, a next SIS channel is determined using a computation deterministic from information in a previously exchanged packet. The determination and of a next channel can have wide variation, as well as the timing of procession through a channel set, and what is important is that both devices in a communications link use cooperative rules and iterate through an SIS channel set in the same order.

FIG. 10 illustrates in further detail the operation of a device on one side of a communications link using DSS communication, the device including a transceiver 82 of a type including the Semtech 127x transceiver in conjunction with a microcontroller 81. Transceiver 82 includes a register FC for the current frequency being used in transmission, a register FN for the next frequency to be used, and a packet buffer PB containing the contents of a packet being transmitted, as well as other programmable registers used in setup and operation. To initiate a packet exchange, the microcontroller 81 identifies a frequency sequence of a channel 83 (which may be that of an SIS channel), and transfers the first frequency value $f_0$ and the next frequency value $f_a$ to those registers on the transceiver as shown. If the exchange is a transmission to the device on the other side of the link, all or part of the contents of a packet will also be transferred to the packet buffer on the transceiver 82. When the registers on the transceiver 82 are loaded and communications setup has been completed, the transceiver is commanded to initiate communication.

For both transmission and reception, as DSS communication proceeds transceiver 82 frequency hops, moving the value of the next frequency FN to the current frequency FC. Before the time of the succeeding hop, microcontroller 81 is interrupted, and a succeeding frequency value is transferred to FN from the identified frequency sequence 83. Eventually the packet exchange will complete, and microcontroller 81 will be interrupted to do whatever post-processing is needed, including a reading of the transceiver's packet buffer PB if a packet was received.

As introduced above, synchronization of a traversal through a set of SIS channels may simply occur for each packet, channel switches occurring therebetween. Another method of synchronization is depicted in FIG. 11, wherein a "left" device synchronizes SIS channel switching with a "right" device over a wireless link through information contained in transmitted packets. Proceeding down the page, both devices are initially synchronized on channel 00, the right device in a listening mode prepared to receive a packet. The left device transmits a packet 101 on channel 0. Packet 101 includes a preamble, the address of the right device "RR", and a payload portion. Contained within that payload is a directive 101a to change to channel 01. Following the exchange of packet 101, the right device transmits an acknowledgment 102 to the left device on channel 00, which serves as confirmation that the right device will listen for future packets on the new channel as directed. Following the exchange of packet 102, both the left and the right devices are synchronized on channel 01.

The left device may send another packet 103 containing a directive 103a to change to channel 2. This packet is not received by the right device, so no acknowledgment is returned and a timeout 104 occurs. In such an event, the left device may resend 105 the packet containing the same directive 103a, until that directive is received and acknowledged 106 by the right device. Should an acknowledgment packet not be received by the left device, both devices may timeout and revert back to a default channel. As continuing to transmit the same packet would increase the impact on the preamble frequency of the current channel in use, it is preferable to limit the number of retries to a predetermined number.

It may be desirable to use the current SIS channel for transmissions from both devices while communicating, so as to equalize the spectrum impacts of transmissions from both devices at the same time, although that is not necessary. One device, such as the right device in the example of FIG. 11, may utilize a separate channel for acknowledgments or packets generally, or may even use an independent SIS channel selection for transmissions to another device on the other side of a link.

Depicted in FIG. 13 are the states of a state machine suitable for implementation in a microcontroller utilizing an SIS channel set, in a configuration shown in FIG. 10. After initialization or during normal operation, the microcontroller may determine that it is time 120 to send or receive a packet to or from the device at the other side of the communications link. If more than one transceiver is available to use, then one of them may be selected at this point. In this implementation, the next step is to determine a value next_channel, which is to be the succeeding SIS channel used. Where the device receives a channel directive by way of packets, this determination may be omitted.

The transceiver is then programmed 124 with a current frequency FC and a next frequency FN for DSS frequency hopping, to be done as in FIG. 6, coming from the current channel frequency sequence. This programming may be done through lookup in a table, or by computation, as desired. An index into the frequency sequence is set 126 to FSI=2, pointing to the third frequency in the sequence.

The machine then must take some extra actions if the device is sending a packet 128. These actions are to build a packet in a buffer 130, in accordance with whatever protocols are used by the present and remote devices. If the present device is determining the next channel for the remote device, part of this built packet may contain a directive to move to the next_channel determined earlier. The built packet is then copied to the transceiver 132, the state is set to transmitting 134, and a command is sent to the transceiver to transmit the packet in its buffer 138. If the device is merely receiving packets 128, then the state can be set to that 136 and the transceiver commanded to receive 140, having been properly configured with all necessary communications parameters.

Following the commanding of the transceiver, a sleeping state 142 may be entered. Now it is to be understood that this state could shutdown the microcontroller entirely until something further happens, or this state could indicate that the processor is free to manage other tasks. For example, a device implementing a sensing function that reports only when prompted may sleep for long periods of time, awakening only to manage long timeouts and other maintenance functions. In another example, a device managing multiple transceivers such as a hub may leave the state in sleep for the present transceiver, turning to manage other transceivers or functions as needed. Regardless, for discussion purposes the state machine may remain in a state of sleep until certain events happen.

While in sleep mode, interrupts 150 will be generated by the transceiver. When they are, there are several state paths that can be taken. If the next frequency register FN has been copied to the current frequency register FC, it will be dry 152 and need to be reloaded. If that has occurred, the next frequency in the sequence will be set 154, and the index incremented 156. If the index exceeds the number of channels in an SIS sequence, it may be set to 0 (the preamble frequency) or 1, avoiding re-use of the preamble frequency. If the packet has been fully exchanged 158, the main thread may be awakened 160 to exit the state of sleep. If the interrupt occurred for some other cause, such as the expiration of a timer or an alarm event, other processing 162 may occur in response. Interrupt processing will end 164, and the microcontroller may return to a state of sleep or may proceed in an awakened state.

When awakened, the current channel will be rotated 144 with the next channel determined earlier, and any post-processing needed may be done 146. That post-processing may include retrieving and decoding a packet if one was received by the transceiver, and may further include the setting of a current_channel, when directed from the device on the other side of a link.

To avoid timeouts that cause a reversion back to a default channel, periodic packets may be sent at an interval less than the timeout period, which packets may be simple "ping" packets.

The teachings regarding SIS channel sets can be applied to two devices in a simple point-to-point fashion, or to multiple devices in varying interactions such as hubs and end-devices. Where a hub is used, a frequency sequence index may be kept for multiple devices, such that spectrum impacts can be smoothed with respect to individual of those devices.

SIS channel sequencing by scheduled transitions.

Where sufficient timing resources are available, the overhead associated with channel directives and corresponding acknowledgments can be avoided, while still maintaining SIS channel synchronization over time. Such timing resources are often available on a microcontroller 30, although they can be located elsewhere. One kind of timing resource is an interrupt-generating timer, which may be thought of as a count-down clock that interrupts the present processing occurring on a microcontroller for substantially instantaneous handling. Another timing resource is a free-running counter, which is a counter automatically incremented on the passage of each period of resolution, which may be thought of as a counter measuring the time of passage since reset as measured in microseconds or some other period. Modern microcontrollers often have this kind of resource available through registers located at a pre-specified address, a read operation reading the count-up or count-down time of the resource and a write operation sometimes setting a time of alarm or interrupt. The use of these resources vary depending upon the microcontroller used, which may ordinarily be found in provided documentation.

Now turning to FIG. 14, a left and a right device are in communicative proximity, each device capable of transmitting packets to the other. The left device may transmit infrequently to the right device, however in this example, the left device sometimes has a need to transmit a stream of packets to the right device at a higher rate, introducing the possibility of a focused spectrum impact as described above. Where a left device is to use a sequence of SIS channels, a packet 200 containing a streaming directive SD may be transmitted to the right device. Here packets of an ordinary format are used, here containing a preamble, and address of the intended destination device, and other information such as a CRC, etc. Streaming directive SD may simply be a flag contained in the payload that signals to the right device that an SIS sequence will be used in following packets. Alternatively, streaming directive SD may contain other information, such as the identity of a sequence to be used, timing information, and other information such as communication parameters. An acknowledgment packet 202 may be sent to the left device confirming receipt of packet 200, which practice may avoid a left device proceeding with a stream transmission not received due to a dropped packet 200.

Following either of a packet containing a streaming directive 200 or acknowledgment 202, the left device may send a sequence of packets 206, in a number defined by the protocol and operation of the particular devices involved. For example, where a block of data is to be sent immediately, the number of packets 206 would generally be sufficient to transmit all of that data, up to the capacity of the channel within the time needed to pass through an SIS channel sequence. If the amount of data exceeds that capacity, additional groups of packets 200, 202 and 206 may be transmitted as needed. The left device and the right device have configured thereto a point of synchronization 204 whereby both devices can determine the times of SIS channel succession with acceptable accuracy relative to the other. In this example, and as may be used in the Semtech 127x transceivers, the point of synchronization 204 is the time of packet completion of the packet 200, which may be through the generation of an interrupt to a microcontroller.

Now turning to FIG. 15, the succession of SIS channels occurs at a regular interval P, beginning at the point of synchronization 204. This succession happens regardless of whether packets are transited or not, rather both devices observe the succession on a timed basis. Each packet is transmitted entirely using the SIS channel in effect at the start of that packet. So, for example, the transmission of the packet labeled $LS_1$ is initiated during the first channel period P while the SIS sequence is in channel $Ch_1$, and even though the packet transmission extends into the next period, the transceivers of both devices remain programmed for that channel. After a transiting packet has been completed, the transceivers are permitted to be programmed for a succeeding channel. Although the example of FIG. 15 shows packets to be a certain size relative to the channel period P, packets can be shorter or longer in duration, such that it may be that several packets are transmitted during a period P, or one packet transmission spans two or more time periods, which will depend upon the communications parameters used.

Within channel periods P, the exemplary method presented herein includes two uncertainty periods 208 and 210, coming immediately before and after the transition from one SIS channel to the next in sequence. During these periods, the left device is not allowed to initiate a packet transmission. These periods of uncertainty are used to avoid errors in communication due to one device being configured for one channel while the other device is on a different one. The period 208 is set sufficiently long to cover the time needed for the right device to detect a packet-in-progress, which may be the time needed to transit the number of symbols or bits in a preamble sequence with a predetermined accuracy. The period 210 is designed to be sufficiently long so as to cover the time needed for either device to program a transceiver to a succeeding channel. Both periods should allow for additional time as needed for other events, such as for the processing of interrupts. Additionally, the uncertainty period 208 may vary depending upon the symbol rate used, which may depend upon a spreading factor used. Alternatively, the period 208 may be set for the slowest rate to be used, or the longest useful duration. Periods 208 and 210 may also be combined into one, and corresponding modifications made to state machines and methods such as those described below.

Further in FIG. 15, the left device has two packets, $LS_2$ and $LS_3$ shown in dashed lines, ready for transmittal during uncertainty periods 208 and 210. The left device may simply wait until the periods have uncertainty have passed, and then both devices will be synchronized again in their SIS channel. Because no data is transmitted during such a waiting period, it is preferable that the uncertainty periods be confined as short as possible. Furthermore, the duration of uncertainty periods should be set with some allowance for such things as clock drift and short interrupt procedures at both sides, and may be set in practice against actual hardware in real-world conditions.

Figure 17:
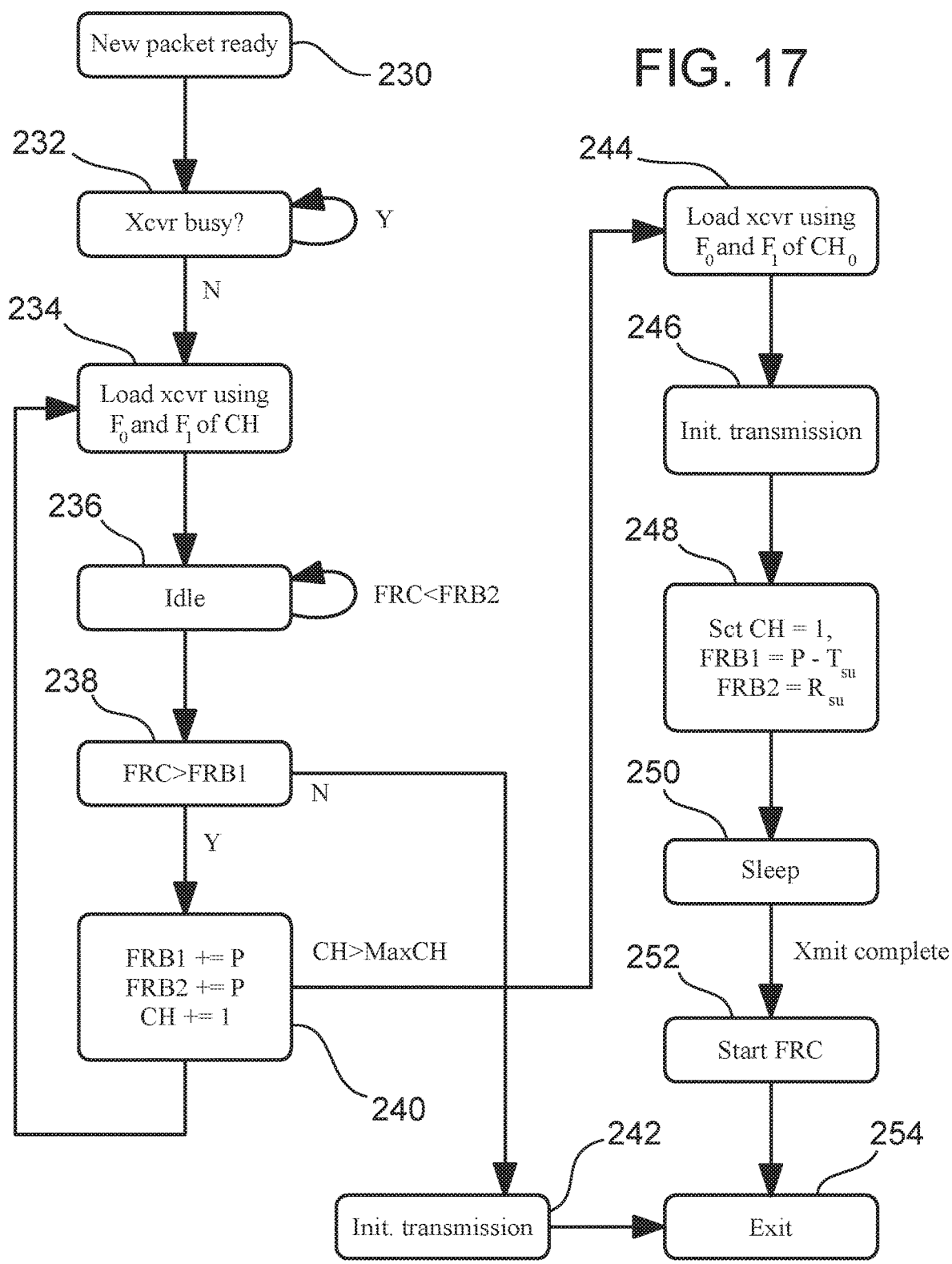
FIG. 17 depicts an exemplary state machine of a stream-transmitting wireless device observing a time-slotted SIS channel schedule.

Skipping ahead in the drawings to FIG. 17, a state machine is shown which may be used in a left-sided device to stream data to a right-sided device utilizing an SIS channel sequence. For these states it is assumed that one transceiver is available for each device, and for simplicity of explanation the assumption is made that no other devices are communicated with. Where it is desired that a device will communicate with more than one other device, the states shown may generally be duplicated for each pair.

Whenever a new packet has been assembled and is ready to be transmitted 230, a query is first made 232 as to whether the transceiver is busy or open for use. It is possible that a transceiver will be engaged in the reception of a packet from another device, which can be difficult to anticipate, and it is possible that a previous packet is being transmitted, from an earlier transiting or from another cause. When the transceiver is clear, it may be reserved for use or otherwise locked, buffers loaded with the contents of the assembled packet, and the first frequencies $F_a$ and $F_1$ of the current DSS sequence of channel CH loaded 234.

The method of the machine of FIG. 17 on the left and stream-producing side makes use of a free-running counter and two boundary values FRB1 and FRB2. Referring back to FIG. 15, FRB1 contains the value of the free-running counter upon entry of uncertainty period 208 in the present period P, and FRB2 contains the value of the free-running counter upon exit of uncertainty period 210 in the next period P. The precise values of the free-running counter and these boundary values will depend upon the hardware used, that is the frequency of incrementing, the use of the same number of bits in values, etc. The index of the current SIS channel in sequence is maintained in CH, and for the machine shown simply iterates through the available channels.

Following a loading of the transceiver 234, a check 236 is made for presence in uncertainty period 210, which is known by the condition of the free-running counter being less than FRB2 The machine remains in this state while this condition is true. It is to be recognized that the busy-waiting shown need not be employed, rather instructions to sleep for short periods, timers, idle instructions and other means may be used to reduce power consumption where desired. From state 236 a test is made 238 for presence in uncertainty period 208, known by the condition of the free-running counter being greater than the FRB1 value. When not present in that period, the state machine proceeds to initiate a transmission 242 and the machine managing SRS channels on the left/streaming side may exit 254.

Where the device remains in the uncertainty period 208, the left side will need to move to the next SIS channel in sequence and wait out the expiration of uncertainty period 210. This occurs in state 240—here where the SIS channels are traversed sequentially the current channel CH is incremented. Having changed channels, the P value is added to the boundary values FRB1 and FRB2 to reflect the new periods of uncertainty in the future. The specific value of P is generally the number of counts or increments on the free-running counter during the period P as shown in FIG. 15.

Once operations in state 240 are complete, the machine moves to one of two destinations. The left and right devices will eventually run out of SIS channels in the sequence; the value MaxCH is the final channel in that sequence. If the value of the current channel CH remains on a valid channel, the state machine returns back to load the new channel parameters 234 and wait for the expiration of the period bounded by FRB2 236. Otherwise, the value of the current channel CH has exceeded MaxCH, and the machine depicted in FIG. 17 resets to start a new SRS channel sequence. Using an alternative method, the devices may be allowed to use SIS channels more than once in a sequence, by either returning CH to 0 or another previous value, or by a reduction function that returns a channel identifier from a counter or index in sequence. In those alternatives, an SIS sequence may be terminated by a limit on the number of channel switches, a limit on the time in a sequence, or an interval of communication inactivity among other things.

Where a reset is indicated, the machine of FIG. 17 proceeds 244 to load the transceiver with the first frequencies $F_0$ and $F_1$ of the first channel, and optionally load the packet buffer and other communications parameters as needed. The packet buffer may be loaded to include a packet with a new sequence directive as in packet 200 in FIG. 14, which may be helpful to signal the right device to initiate new timing. Transmission is then initiated 246. The values of FRB1 and FRB2 are reset to the new uncertainty period boundaries at P-$T_{su}$ and $R_{su}$, respectively, where $T_{su}$ is the interval of uncertainly period 208 and $R_{su}$ of period 210 as measured by the free-running counter. As shown, the current channel CH is assigned to 1, although additional packets could be transmitted on the initial channel, if desired.

The machine then sleeps 250, pending the completion of the packet transmission. The point of synchronization 204 used in the machine of FIG. 17 as shown is the same as that of FIGS. 14 and 15, that is the end of the packet containing a channel directive. That being the case, the free-running counter is started 252 and the state sequence ends 254. It is to be understood that if implemented in a microcontroller, other processing tasks may be engaged during the time of sleep 250, but it is preferred that the microcontroller be immediately responsive to the event of packet transmission completion, so the free-running counter is started substantially without delay. Where a stream is first being initialized, the steps 244 through 252 may be sequenced through substantially as shown. Also not shown are states and steps for processing an acknowledgment 202 in FIG. 14, and possibly retransmittal of an LSI packet 200 and reinitiation of an SIS channel sequence where an acknowledgment is not received.

Figure 19:
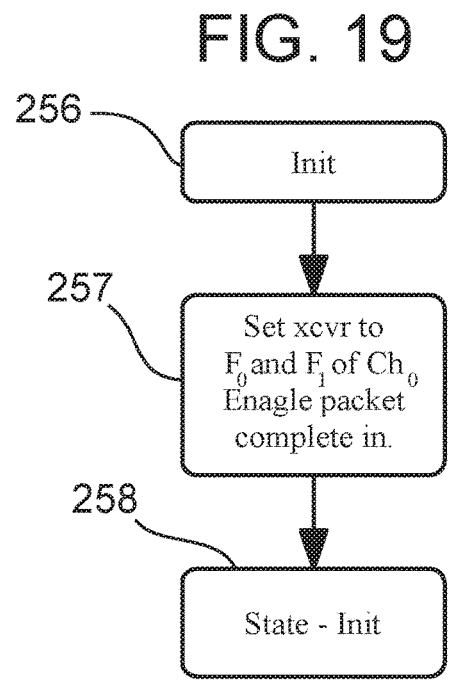
FIG. 19 depicts the initialization of an exemplary state machine of a stream-receiving wireless device observing a time-slotted SIS channel schedule.

The left/streaming device may use a free-running counter as described above. The right/receiving device presented herein uses timer interrupts and is more complex. The right-side device includes a state that indicates whether it is in a state where an SIS channel streaming operation can be initiated, or whether one is presently in progress. At various times, that initial state may be engaged through the process shown in FIG. 19. An event causes the right side to initialize streaming 256. The transceiver is first set 257 to the first frequencies $F_0$ and $F_1$ on the initial channel $Ch_0$. The transceiver is then enabled to receive a new packet, including programming to generate an interrupt on the completion of that new packet. The state variable is then set 258 to indicate that a new reception of streamed packets on an SIS channel sequence is ready to initiate.

Figure 18:
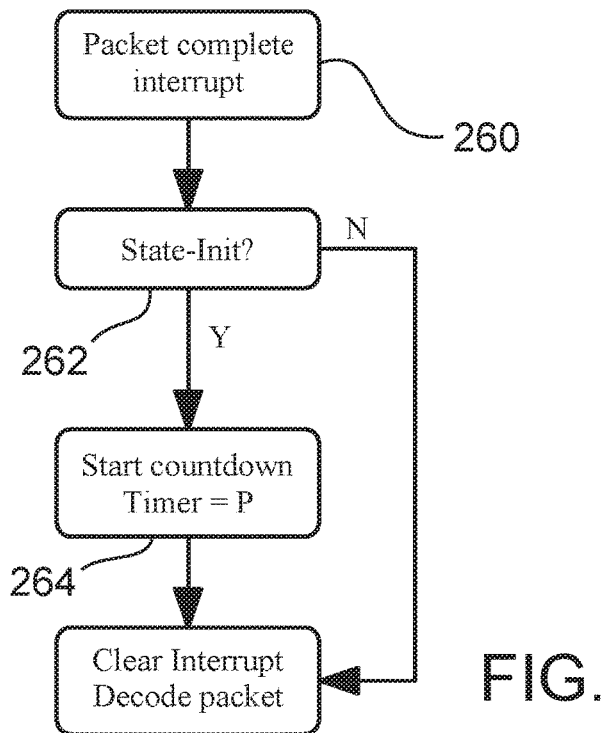
FIG. 18 depicts an exemplary state machine of a stream-receiving wireless device managing packet-completion interrupts.

Continuing in FIG. 18, an interrupt will eventually occur signaling the completion of a packet 260. This interrupt may or may not be a synchronization event, 204 as shown in FIGS. 14 and 15. The state variable is immediately examined 262 to identify whether a new SIS streaming sequence is ready to start. If yes, a countdown timer is started with a period of P, the same P discussed above for the left/streaming device in ten of timer counts. The right/receiving device may then clear the interrupt produced by the packet completion, and the packet decoded 266. If desired, a small amount of time may be subtracted reflecting the expected processing between the completion of the packet and the starting of the timer. It is preferred that this processing be kept to a minimum so as not to introduce errors in the SIS channel synchronization between the left and the right devices.

At the time state 268 is entered, a timer will have been started either from the start of the latest packet or the last SIS channel transition (as will become clear shortly), and the packet generating the interrupt has been decoded and found to be valid. At this time the packet may be checked for a streaming directive. If the packet contains one, the transceiver is initialized 270 with the first frequencies $F_0$ and $F_1$ on the next channel $Ch_1$, the current channel CH is set to the same, and the state variable is changed from "init" to "sequencing", avoiding the restarting of a timer at state 264. As discussed above, the move from channel 0 at this point is simply a design choice and is not necessary. The received packet may then be processed normally 272.

If at state 268 the received packet does not contain a stream directive, the state variable is checked 274 whether the right device is in "init" or "streaming". If the state variable is "init", the right device remains in a readiness state for the starting of a stream, and does not need a timer. The countdown timer is stopped 276, which is the same timer that was started at state 264. The received packet may then be processed normally 272.

If at 274 the state is not "init", then a streaming operation is in process, and the possibility exists that the processing from the packet reception to the present covered the expiration of an earlier-set timer, perhaps masked by the packet complete interrupt. If the timer has not expired, then the regular interrupt procedure (discussed shortly) will handle the next expiration and no further action is needed as to SIS channel management, and the received packet may be processed 272. Where a timer has expired, and the state is "sequencing", a countdown timer needs to be restarted 282. In one method, the passage through the machine from the interrupt 260 is assumed to be inconsequential, and the timer is set to countdown using the usual value P. In another method, compensation is made for delays in the restarting of the timer. If the timer continues to count after expiration, that value can be subtracted from P when it is reset. Where a timer stops upon expiration, a free-running counter can be used to detect the amount of delay and any amount in compensation to be applied, by subtracting the value of the free-running counter at the time of timer reset and the present time.

Having noticed the expiration of the timer, the present SIS channel is incremented 284. If the current channel exceeds MaxCH, the SIS channel sequence has ended. In that event 286, the countdown timer is stopped, the current channel CH is set to zero, and the state variable is returned to "init". Either way, the transceiver 278 is set to receive incoming packets on the current channel CH, and the content of the incoming packet is processed 272.

FIG. 16 depicts a state machine concerned with managing SIS channel sequencer timer interrupt events. Upon receiving a timer interrupt 212, the first step 214 is to restart the countdown timer to expire at the period P and to clear the interrupt for further possible processing. If a check 216 against the state variable shows the right device is not presently sequencing, the interrupt processor waits for the transceiver to clear any busy condition 218, and then proceeds 224 to stop the countdown timer, set the current channel CH to 0, the state value returned to "init", set the transceiver to receive packets on the initial channel, and enable interrupts on packet completion. This path through the machine may be expected not to occur unless timer events are generated on some other mechanism other than the SIS channel sequencer. The steps listed in state 224 operate to reset the channel sequence generally.

If at check 216 the state is found to be sequencing, the current channel CH is incremented. Next, if the current channel CH has exceeded the MaxCH value, the sequence has run its course and the machine resets branches through states 218 and 224 as described above. Otherwise, the machine waits 222 for the transceiver to clear any busy condition, and then sets the transceiver 228 to receive a packet on the current channel CH.

It is to be understood that the methods using free-running counters and timers described above can be applied to either a left/streaming or a right/receiving device, and that the implementation observing SIS channel switching based upon regular times can be varied from the examples presented herein according to the knowledge of a person of ordinary skill in the art.

Deferred acknowledgments in SIS channel streaming.

Where communications may suffer interruptions, acknowledgments can be used to ensure packet delivery. An exemplary protocol will now be discussed in connection with FIG. 20a, again with a left stream-producing device and a right stream-receiving device, utilizing two acknowledgment methods. Omitted from this figure are the preamble and packet headers, such as those shown in FIGS. 11 and 14, with the exception of a device identifier which may be included in a packet header. Packets 300 and 302 depict a typical handshake acknowledgment, that is the left side transmits a packet to the right device followed by an acknowledgment back. This protocol allows for channel directives 300a as well as stream directives 300b, both of which are described above. Regardless of whether these directives are present, a handshake acknowledgment 302a confirms receipt of packet 300 and removes a need for retransmission. Present in this protocol is a flag 300c that indicates, when set, to the other device that an acknowledgment is expected. In the exemplary protocol, each packet may contain additional payload and data if needed, thus packet 302 pay contain just an acknowledgment or additional data provided to the left device.

Handshake acknowledgments impose a large bandwidth load upon a half-duplex communications channel between devices, particularly where a long preamble is used. Thus even though the acknowledgment 302a may be only a single bit, the overhead of the preamble and address that accompanies the acknowledgment may reduce the data throughput of the channel by up to half.

To lessen the impact of acknowledgments on a stream of packets, the exemplary protocol allows acknowledgments to be grouped together and deferred to a later time. Continuing in the exemplary protocol depicted in FIG. 20a, a new stream of packets is initiated by a packet 304 containing a stream directive 304b. Here packet 304 includes an optional acknowledgment request 304c, and the right-side device responds with an acknowledgment packet 306 confirming receipt of packet 304. Thus were packet 304 to be dropped, that error could be recovered from by a retransmittal of that packet alone and not the packets of the entire stream. Following the acknowledgment 306d, the stream-producing device sends a succession of nn packets 308 through 314 containing the streamed data, each containing a packet identifer 308e and 310e through 312e and 314e.

In the protocol as shown, the stream-receiving device only sends acknowledgments when it receives a request for that information, that is when the AR flag is 1. Thus in the example, the acknowledgment packet 316 follows the final streamed packet 314, which contains an AR flag that is set. In an alternative, the stream-producing device could send a separate packet at any time during or after transmission of a stream containing an acknowledgment request, at the expense of an additional packet overhead.

All streamed packets may contain a packet identification value, such that each packet transmitted may be referenced at a later time in acknowledgment of receipt. (Packets not in a stream may also contain an identifer, but that isn't required for deferred acknowledgment.) It is preferred that the number of possible identification values be equal to or larger than the greatest number of packets that may be included in a single stream, so that each packet may be uniquely referenced in each deferred acknowledgment. As shown, a packet in a stream may include an identification value incremented from the one included in the previous packet transmitted, although that is not required. So, for example, where the left device in transmitting packet 308 used an identification value of 01, the following streamed packet 310 uses a value of 02, the one after that uses a value of 03, etc. Furthermore, where identification values follow an ordered scheme, packets may be transmitted out-of-order, so long as all are transmitted in the course of transmitting a stream. On a communication error and where the number of possible identification values is smaller than the number of packets in a group, the stream-producing device may retransmit each packet having a shared identification value, provided that preservation of the sequence of the streamed packets is not needed or may be reconstructed by the stream-receiving device.

In the exemplary protocol, an acknowledgment request may be accompanied by a specification of the packet identifiers to report. For example, the packet 314 specifies a report on packets 1 through nn, requesting a single report on the reception of all packets in the stream just transmitted. The response packet 316 acknowledges that all packets were received except for two having identifiers of 3 and 17. The specific form of the acknowledgment may report those packets received, those packets missed, all packets were received or missed, or where acknowledgment is being made to a single packet or to a block the acknowledgment flag alone may be sufficient. In one alternative, acknowledgment reports may be a sequence of bytes terminated with 0 or some other predetermined number. Thus the acknowledgment report 316h might be the sequence 3, 17, 0 and the acknowledgment report 322h might be simply a 0. Assuming that a communications channel will be reliable, most packets will be received without error, and therefore it is expected in practice that the most efficient forms of acknowledgment in terms of number of bytes will report missed packet identifiers.

Following transmission of a packet such as 316 by the stream-receiving side, if that packet is not received by the stream-producer, another packet containing an acknowledgment request may be sent, which may be a duplicate of 314. Otherwise, the stream-producer transmits any packets reported to be dropped 318 and 320, and a new acknowledgment request 320c is sent. This procedure may be repeated as many times as necessary until all stream packets have successfully transited the communications link, upon which an acknowledgment packet 322 may be sent reporting that all were received 322h.

In one alternative mode of operation, a stream-receiving device may retain a record of received packet identifiers until an acknowledgment report is transmitted reporting successful reception of all identifiers and a following packet is received that does not include an acknowledgment request specifying a packet identity group or range. Thus if one of packets 316 or 322 containing an acknowledgment report were dropped, the stream-producing device could repeat a packet request such as 314 or 320 as many times as needed until an acknowledgment report arrived successfully. The right device would discard the packet identifier record upon receipt of a packet subsequent to 322 and its repetitions, if any.

A flag or other indicator 304f may be included in a stream-initiating packet that informs a receiver whether packets may be processed out-of-sequence, which may be important where one or more packets in a stream is dropped. There are kinds of streams that rely upon the presence of earlier packets, for example those that are compressed or involve some kind of cyclic encryption. A flag indicating that packets may only be processed in-sequence 304f may be helpful in causing a deferment of processing by a stream-receiving device until all of a stream of packets has been successfully received. It may also be the case that this flag is not needed, particularly where the context or content of a stream is known at a receiving side.

In one alternative, a group information directive 304g may be sent with a stream-initiating packet 304, informing the stream-receiver of the packet identifiers that will be included in the stream to be transmitted. In the example, the right-side device is notified 304g that the streamed packets will contain identifiers beginning with 01 and ending with nn. Where such a group information directive is included, identifer specifications may be omitted from acknowledgment requests such as 314c and 320c where a report is to encompass the entire set of packets in a streamed group. Where group information is provided and in another alternative, the acknowledgment request 314c may be entirely omitted: rather the stream-receiving device may simply submit an acknowledgment report after receiving the last packet in the stream. A group information directive may also assist a stream-receiving device in reserving a sufficient amount of memory for buffering of packets.

FIG. 20a shows a stream initiated by a streaming directive 304b, which may include traversal through an SIS channel sequence as described above. The exemplary protocol also provides for streaming using channel directives. Where that is to be done, the streaming directive 304b would be omitted, and any of the streaming-initialization packet 304 and the streamed packets 308-314 may include a channel directive, with or without an acknowledgment request. Where acknowledgments are not used mid-stream, a possibility is introduced that the two sides become desynchronized with respect to the current SIS channel, resulting in the loss of all further packets in the stream. It is therefore preferred that channel directives in combination with deferred acknowledgments be limited to use on those connections that are more reliable.

In a further alternative, a streaming directive 304b may specify no departure to whatever SIS channel sequence is engaged, if any. This may be accomplished by the specification of a sequence of 00, for example. Thus at the time a streaming-initiating instruction is given such as 304, the inclusion of SD-00 would do one of two things. If an SIS channel sequencing was underway at the time, that rotation would be continued as further streamed packets were exchanged. If no SIS channel sequencing is underway, then streaming may be conducted on a single channel, although the RF spectrum may be subjected to a focused impact as discussed above. Furthermore, a new SIS channel sequence may be initiated mid-stream, by the inclusion of a stream directive in a streamed packet such as 308-314, for example by the method described in connection with FIG. 17. Under those circumstances, a group information directive would preferably not be present, rather any such directive in effect would remain so. This may be done, for example, where an SIS channel sequencing was underway at the beginning of a stream of packets, and that sequencing ended or expired mid-stream. In this way the spectrum impact may continue to be smoothed, even where multiple streams or groups of packets are sent substantially continuously.

In a further alternative using timed SIS channel sequences, a calculation is performed to produce a number of packets in a group wherein the end of the transmission of the group of packets coincides with the end of an SIS channel sequence being used. By so doing, the starting of SIS channel sequences during a stream transmission may be avoided.

Broadcasting Streams with Efficient Acknowledgment and Retransmission

In an alternative to that described above, SIS channel streaming may be applied to broadcasts made to a plurality of destination wireless devices. Broadcast streaming may occur through a cloud base network such as described in U.S. Pat. No. 9,667,768, issued May 30, 2017, to Hall et al., which is incorporated herein by this reference in its entirety for all that it teaches and claims. The broadcast may originate at a location remote from the cloud based network, pass through the cloud based network, and then be received by the destination wireless devices that are remote from the cloud based network. The devices of this disclosure may communicate through a cloud based network at intermediate ranges. Where a duplicate block of information is to be delivered to more than one device, it is more efficient to send the same information to all devices using a single set of packets in a common stream. This is particularly true where an intermediate-range network is used, which can be more susceptible to the impacts of crowded environments. In several examples, a duplicate block of information might include a firmware update, images to be included in a common control interface, a user interface sequence in macro form, a set of cryptographic security certificates, a schedule controlling the operational state of devices at various times, or an address map to devices on a network. Above was discussed the use of an SIS channel sequence to avoid focused impacts upon a radio frequency spectrum, mainly from the perspective of a point-to-point connection between two devices. When broadcasting a stream of data using an SIS channel sequence, there are complications that can be addressed as follows.

Figure 20B:
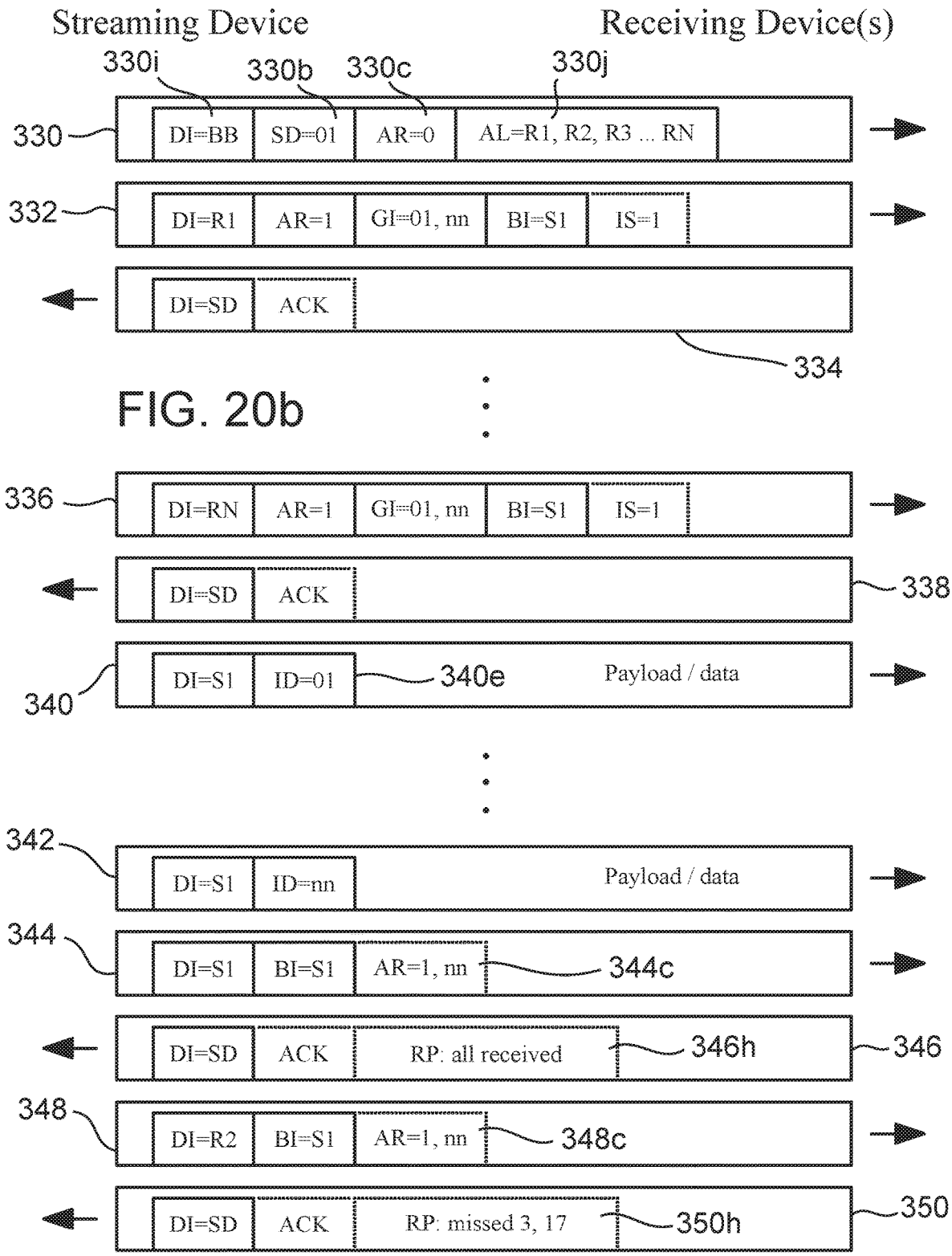

In FIG. 20a, an address field of packets might have been included, which would be that of the left/streaming device or the right/receiving device depending upon which was the destination. Continuing the discussion into that of streamed communications, further packet depictions into FIGS. 20b and 20c include a device identifier DI specifying the destination of packets. This field may be part of a packet header, and packets destined for devices may be filtered out in the course of packet reception at the transceiver or the packet processing stages. This field DI may specify a single device, or a group of devices as will be explained below.

In the exemplary protocol described in FIG. 20b, an SIS directive is contained in the first packet 330 in a broadcasted stream. This first packet includes a directive 330b to begin communication using an SIS sequence identified by the field SD, here the sequence identified by the value 01. Where this initiates a broadcasted stream, this packet is directed to more than one receiving end-device so that all may execute the same SIS channel sequence at the same point of synchronization in time. To that end, the device identifier DI is set to a selected value BB that indicates that all devices receiving are to process the content of that packet, and apply the directives included. Where a broadcasted packet is directed to particular end-devices, a list of device addresses AL may be included, which are R1 through RN in the example depicted in the Figure.

Now this packet can be dropped or otherwise not be received by any of the devices intended to receive a stream, and this situation can be handled in a number of ways. In a first method, the streaming device may send a ping packet to each device in the list AL, verifying that it is sequencing SIS channels correctly. Should any device not respond, perhaps after some number of tries, it can be assumed not to have initiated the SIS channel sequence. The streaming device may then remove a non-responsive device from the list, and schedule it for a subsequent stream operation after the present one completes. Alternatively, the stream-producing device may command a reset of the SIS channel sequencing, and then repeat packet 330 in a retrial on a default channel. In a second method, the streaming device simply proceeds to send the stream and then detects a problem at a later time, such as during group acknowledgments as described below.

In a third method as shown in the Figure, a packet stream-initiating packet 332 is sent to each device intended to receive the stream, beginning here with device identifier R1. As with packet 304 described above, a group information field GI is sent, and an optional IS field may be present as well. Further included in packet 332 is a broadcast identifier BI containing the address that will be used in the broadcast of this particular stream. The use of the BI field permits further packets to be transmitted to all devices at address BB, and may further allow for the transmission of two or more concurrent streams to different devices receiving on the same SIS channel sequence. The BI field may be omitted where its value is either implied or not needed. When the information field GI is received, an end-device may reserve a buffer sufficient to store all of the streamed data, which in this example may be nn multiplied by the size of data pieces transmitted within data block packets as determined earlier. Whereas packet 330 includes an acknowledgment request AR field of 0, this packet 332 requests a packet response 334, which operates as a confirmation that the device as received the streaming directive. This procedure continues for each device intended to receive the stream, ending with the device RN in packet 336, acknowledged in packet 338.

Having provided each device being broadcasted to of the information GI in the streaming group, the transmission of the streamed information may commence. A first data block packet 342 is sent, that packet having a device identification DI=S1. As this is the same as was sent to each intended receiving device earlier in packets such as 332 and 336, each device is sufficiently configured to receive data block packets in broadcast mode. As described above in connection with FIG. 20a, data block packets each carry an identifier 340e and a payload that is a piece of the data being broadcast. As data block packets are sent, the receiving end devices transfer this payload content to a buffer at a location corresponding to the packet identifier, and make an annotation that the piece of data corresponding to that identifier has been received. At the time the group information GI was received in packets such as 332 or 336, the receiving end-device may have created an empty record upon which such annotations may be stored, each of which annotations may be a single bit or value changed to mark the presence of a data piece as it is received. The streaming device transmits packets containing data blocks and corresponding identifiers for all the data being broadcast, ending with a packet 342.

At any time after data has begun to be broadcasted, and probably after all of the data has, the streaming device may request acknowledgment from particular end-devices for pieces of the streamed data that have been received, or conversely those that have not. This is done to detect any packets that were dropped or otherwise not received due to RF interference or other issues. So in the example, a first acknowledgment request is sent in packet 344 to the device at address R1, the data stream being identified in field BI as S1, the acknowledgment request being for any of packets carrying an identifier of 1 to nn. In the example the device at address R1 received all pieces of the streamed data properly, so its response 346 carries a report 346h of "all received". The streaming device may repeat packet 344 until a response is received. When such a packet 346 is transmitted, two things happen. First, the streaming device may change state to the next end-device in the list 330j. Second, the acknowledging end-device may apply the streamed data in whatever way is appropriate and release the earlier-reserved buffer. This may occur after a preset time to permit the streaming device to retry acknowledgment requests in case of communication error.

Acknowledgment requests may proceed for each end-device in list 330*j*. Thus a subsequent packet 348 is sent containing an acknowledgment request to the device at address R2. In the example, device R2 did not receive data block packets having the identifiers OD=3 and ID=7, and it so reports this in packet 350. Continuing the examplary exchange into FIG. 20*c*, the missed data pieces are transmitted in packets 352 and 354, an acknowledgment request is repeated 356, upon which the device responding to the address R2 reports that all packets are now received 358.

Note here that packets 354 and 356 in the exemplary protocol carrying retransmitted data pieces do not carry a device identifier of R2, which is that of the device that reported it did not properly receive those data pieces. Rather, these packets are transmitted to all devices receiving the stream S1, and any of those devices may receive that data at that time. In a preferred configuration, all end-devices receiving a stream may simply write that retransmitted data into their corresponding buffer reserved for stream data, whether or not that data was earlier received, and the annotation may be made for reception of a corresponding data piece as described above. It may be that interference in the intermediate-range network is of a bursty character, and interference imposed upon communication in the stream will impact the same streamed packets for all participating end-devices generally. In other words, where there are packets that have failed to be exchanged with one end-device due to noise, all end-devices participating in reception of a data stream are likely to have dropped the same packets as well. Where this is the case, and where the individual destination end-devices are configured to receive rebroadcasted data pieces transmitted in reply to the reports of missed packets from other end-devices, duplicated retransmission of those data pieces may be avoided.

Acknowledgment requests and replies continue through participating devices, to device RN through packets 360 and 362 in the example. Using the preferred configuration, suppose that the device using address RN did not receive a packet with an ID of 3 in the initial data block transmission between packets 340 and 342. That device would receive and apply packet 352, if received, that packet including a device address bearing the stream number S1, even though it might have been received out-of-order. This would be done by that end-device transparently from the operation of the stream-originating device, and thus under those facts the acknowledgment report within packet 362 would still be "all received", assuming that a retransmittal of the data part corresponding to ID=3 was successfully received as earlier transmitted in response to a report of a missed packet from any participating end-device.

In the communications described in FIGS. 20*a* through 20*c*, additional packets may be interposed between any of the packets shown. Furthermore the packets from the streaming device may generally be transmitted in any order through the stages of stream initiation (such as packets 332 and 336 in the example), the streaming of the data block (packets 340 through 342), requests for acknowledgment reports (packets 344, 348, 356 and 360), and retransmission of streamed data (packets 350 and 352). If an SIS channel is currently engaged between several devices, channel initiation packet 330 may be omitted while maintaining a spread impact to the spectrum. Furthermore, a new SIS channel sequence may be initiated during the broadcast of a stream, by the inclusion of a stream directive in a packet such as 330 or 308, by a packet containing a device address to all (DI=BB) or to devices receiving a stream (DI=S1 in the example) while SIS channel sequencing is underway.

Furthermore, where an SIS channel sequence initiating directive without acknowledgment, as shown in FIG. 20*b*, that may be sent on a more reliable channel that has either more error-correction or a higher spreading factor. The SIS channels used in a sequence may be of a less reliable quality or use a lower spreading factor, which may increase the data throughput through the broadcasting of the data block and decreasing the time spent on-air during that operation.

In a further alternative, rather than responding to acknowledgment requests from a streaming device, end-devices may be configured to send acknowledgments after a delay, which delay may be random or according to a time-slotted scheme. For example where a time-slotted scheme is used, each device in an address list such as 330*j* could calculate a time to transmit an acknowledgment, which might be a specified period multiplied by the position of the address of the device in the list. The use of random delays is not preferred, because of the possibility of collisions and the possibility of dead-air spaces.

In a further alternative, the communications received from end-devices during the broadcast streaming operation are made on a fixed channel rather than an SIS channel sequence. Because through a broadcast streaming operation communications are mainly from the streaming device and those from end-devices are infrequent, this can be done without producing a focused impact on the RF spectrum. End devices can also transmit packets using an SIS channel rotation as described above.

In the exemplary protocol as shown and described, informational items take the form of decimal numbers and text: it is to be understood that these forms are merely convenient for the teaching of the concepts introduced herein, and that other forms, radixes, encodings and ranges and other modifications may be adapted in accordance with a person of ordinary skill in the art.

Now although certain systems, products, components, functions and methods have been described above in detail for specific applications, one of ordinary skill in the art will recognize that these functions and methods are adaptable to other systems and products. Likewise, although the described functions have been described through the use of block and state diagrams, flowcharts, and software and hardware descriptions, one of ordinary skill in the art will recognize that most of the functions described herein may be implemented in software or hardware. State machines described herein may likewise be implemented completely in logic, as software executable on a general-purpose or embedded processor, or as a mixture of both. Some of the descriptions herein refer to specific protocols and modulation types, which are only exemplary; other protocols and types may be substituted as desired in accordance with the inventive concepts. More specifically, it is to be understood that although the accompanying description makes reference to the LoRa and LoRaWAN protocols and designs, the inventions described herein may be used in other kinds of intermediate-range networks, RF bands and using other equipment. The exact configurations described herein need not be adhered to, but rather the diagrams and architectures described herein may be varied according to the skill of one of ordinary skill in the art. Therefore, the inventions disclosed herein are to be fully embraced within the scope as defined in the claims. It is furthermore understood that the summary description and the abstract are provided merely for indexing and searching purposes, and do not limit the inventions presented herein in any way.

What is claimed:

1. A system of wireless communications devices operational at intermediate ranges, one of said devices being a stream-producer and others being stream-receivers, said devices utilizing a set of discrete radio frequencies upon which are organized a set of spectrum-impact-smoothed (SIS) channels each having a distinct digital spread spectrum frequency sequence, each SIS channel specifying a unique frequency to be used in a transmission of a packet preamble relative to all other SIS channels within the set, the system comprising:
  a stream-producing device, comprising:
    a memory, and
    a processor in electronic communication with the memory, the memory storing instructions that when executed by the processor cause the processor to:
      (a) transmit to a stream-receiving device a directive to engage communication using an SIS channel sequence,
      (b) transmit to the stream-receiving device a stream-initiating packet, the stream-initiating packet containing group information indicating packet identifiers for each packet that is part of a stream of packets to be transmitted, the stream-initiating packet including a broadcast identifier,
      (c) transmit each packet in the stream of packets to the stream-receiving device using a schedule of SIS channels, wherein each packet is identified by a packet identifier contained within the packet,
      (d) request a deferred acknowledgment from the stream-receiving device following the transmission of the stream of packets, wherein the request is included in at least one of the packets in the stream of packets, and
      (e) receive the deferred acknowledgment from the stream-receiving device following the request for the deferred acknowledgment, the deferred acknowledgment identifying any individual packets in the stream of packets that were not received based on the packet identifier for the individual packet; and
  the stream-receiving device, comprising:
    a memory;
    a processor in electronic communication with the memory, the memory storing instructions that when executed by the processor cause the processor to:
      (f) receive the directive to engage in communication with the stream-producing device using the SIS channel sequence,
      (g) receive the stream-initiating packet containing the group information,
      (h) annotate receipt of a packet identified by the packet identifier contained within each packet for each packet in the stream of packets exchanged using the schedule of SIS channels,
      (i) receive the request for the deferred acknowledgment from the stream-producing device, and
      (j) transmit the deferred acknowledgment to the stream-producing device following the request for the deferred acknowledgment.

2. The system recited in claim 1, wherein the instructions of said stream-receiving device are further executable by the processor to reserve a buffer in memory of sufficient size to contain packets as specified by the group information contained in the stream-initiating packet.

3. The system recited in claim 2, wherein the instructions of said stream-receiving device are further executable by the processor to process the contents of the buffer following the transmission of the deferred acknowledgment indicating that all packets in the stream were received.

4. The system recited in claim 1, wherein the instructions of said stream-producing device are further executable by the processor to:
  (k) retransmit individual packets identified in the deferred acknowledgment that were not received by the stream-receiving device; and
  wherein the instructions of said stream-receiving device are further executable by the processor to:
  (l) receive retransmissions of the individual packets identified in the deferred acknowledgment that were not received by said stream-receiving device.

5. The system recited in claim 4, wherein:
  the instructions of said stream-producing device are further executable by the processor to retransmit individual packets identified in the deferred acknowledgment using the broadcast identifier; and
  the instructions of said stream-receiving device are further executable by the processor to receive individual packets retransmitted that use the broadcast identifier of a particular stream of packets being received.

6. The system recited in claim 5, wherein the individual packet retransmissions are in response to the deferred acknowledgment.

7. The system recited in claim 1, wherein the instructions of said stream-producing device are further executable by the processor to transmit to the stream-receiving device the stream-initiating packet in accordance with the SIS channel sequence indicated in an earlier SIS channel directive.

8. The system recited in claim 1, wherein the instructions of said stream-producing device are further executable by the processor to initiate a new SIS channel sequence during the course of an exchanging of the stream of packets with the stream-receiving device.

9. The system recited in claim 1, wherein the instructions of said stream-producing device are further executable by the processor to transmit an SIS channel sequence directive using a channel having a higher reliability than the channels used in the course of transmitting the stream-initiating packet to the stream-receiving device.

10. The system recited in claim 9, wherein the channel having higher reliability has either a greater degree of error-correction or a higher spreading factor than the channels used in the course of transmitting the stream-initiating packet to the stream-receiving device.

11. The system of wireless communications devices operational at intermediate ranges of claim 1, wherein the stream-producing device and the stream-receiving device communicate with each other through a cloud based network.

12. A system of wireless communications devices operational at intermediate ranges, one of said devices being a stream-producer and others being stream-receivers, said devices utilizing a set of discrete radio frequencies upon which are organized a set of spectrum-impact-smoothed (SIS) channels each having a distinct digital spread spectrum frequency sequence, each SIS channel specifying a unique frequency to be used in a transmission of a packet preamble relative to all other SIS channels within the set, the system comprising:
  a stream-producing device, comprising:
    a memory, and
    a processor in electronic communication with the memory, the memory storing instructions that when executed by the processor cause the processor to:

(a) transmit to a stream-receiving device a directive to engage communication using an SIS channel sequence,
(b) transmit to the stream-receiving device a stream-initiating packet, the stream-initiating packet containing group information indicating packet identifiers for each packet that is part of a stream of packets to be transmitted, the stream-initiating packet also including a broadcast identifier,
(c) transmit each packet in the stream of packets to the stream-receiving device, wherein each packet in the stream of packets is identified by a packet identifier contained within the packet, and wherein each packet in the stream of packets includes a device identification, wherein the device identification was transmitted in an earlier-transmitted stream-initiating packet,
(d) request a deferred acknowledgement from the stream-receiving device following the transmission of the stream of packets, wherein the request is included in at least one of the packets in the stream of packets,
(e) receive the deferred acknowledgment from the stream-receiving device following the request for the deferred acknowledgment, the deferred acknowledgment identifying any individual packets in the stream of packets that were not received based on the packet identifier for the individual packet, and
(f) retransmit individual packets identified in the deferred acknowledgment that were not received by the stream-receiving device; and the stream-receiving device, comprising:
a memory;
a processor in electronic communication with the memory, the memory storing instructions that when executed by the processor cause the processor to:
(g) receive the directive to engage in communication with the stream-producing device using the SIS channel sequence,
(h) receive the stream-initiating packet containing the group information,
(i) filter each packet in the stream of packets based on the device identification in each packet in the stream of packets, wherein the device identification was received in the earlier-received stream-initiating packet,
(j) annotate receipt of a packet identified by the packet identifier contained within each packet in the stream of packets,
(k) receive the request for the deferred acknowledgment from the stream-producing device,
(l) transmit the deferred acknowledgment to the stream-producing device following the request for the deferred acknowledgment, and
(m) receive retransmissions of individual packets identified as not being received in the deferred acknowledgment.

13. The system recited in claim 12, wherein the instructions of said stream-producing device are further executable by the processor to transmit to the stream-receiving device, the stream-initiating packet in accordance with the SIS channel sequence indicated in an earlier SIS channel directive.

14. The system recited in claim 12, wherein the instructions of said stream-producing device are further executable by the processor to initiate a new SIS channel sequence during the course of an exchanging of the stream of packets with the stream-receiving device.

15. A wireless communications device operational at intermediate ranges, said device utilizing a set of discrete radio frequencies upon which are organized a set of spectrum-impact-smoothed (SIS) channels each having a distinct digital spread spectrum frequency sequence, each SIS channel specifying a unique frequency to be used in a transmission of a packet preamble relative to all other SIS channels within the set, said device comprising:
a memory;
a transceiver functional for wireless communication using the distinct digital spread spectrum frequency sequence of the spectrum-impact-smoothed channels; and
a processor in electronic communication with the memory, the memory storing instructions that when executed by the processor cause the processor to:
(a) configure said transceiver to transmit or receive a packet on a channel having distinct communication parameters, wherein the channel is specified by a schedule of SIS channels,
(b) receive a directive from a stream-producing device to engage in communication with the stream-producing device using an SIS channel sequence,
(c) receive from the stream-producing device a stream-initiating packet containing group information indicating packet identifiers for each packet that is part of a stream of packets to be transmitted using a schedule of SIS channels, the stream initiating packet including a broadcast identifier,
(d) receive a plurality of packets in the stream of packets from the stream-producing device using the schedule of SIS channels,
(e) annotate receipt of a packet identified by a packet identifier contained within each packet in the stream of packets,
(f) receive a request for a deferred acknowledgment from the stream-producing device, wherein the request is included in at least one of the packets in the stream of packets,
(g) transmit the deferred acknowledgment to the stream-producing device following the request for the deferred acknowledgment, the deferred acknowledgment identifying any individual packets in the stream of packets that were not received based on the packet identifier for the individual packet, and
(h) receive retransmissions of individual packets identified as not being received in the deferred acknowledgment.

16. The device recited in claim 15, wherein the instructions are further executable by the processor to reserve a buffer in the memory of sufficient size to contain packets as specified by the group information contained in the stream-initiating packet.

17. The device recited in claim 16, wherein the instructions are further executable by the processor to process the contents of the buffer following the transmission of the deferred acknowledgment.

18. The device recited in claim 15, wherein the instructions are further executable by the processor to receive the individual packets retransmitted by the stream-producing device that include the broadcast identifier of a particular stream of packets being received.

19. The device recited in claim 18, wherein the individual packet retransmissions are in response to the deferred acknowledgment from the stream-receiving device.

20. The device recited in claim 15, wherein the instructions are further executable by the processor to initiate a new SIS channel sequence during the course of an exchanging of the stream of packets.

\* \* \* \* \*